United States Patent
Takahashi et al.

(10) Patent No.: US 6,821,205 B2
(45) Date of Patent: Nov. 23, 2004

(54) SERVER DEVICE FOR NET GAME, NET GAME MANAGEMENT METHOD, NET GAME MANAGEMENT PROGRAM AND RECORDING MEDIUM WHICH STORES NET GAME MANAGEMENT PROGRAM

(75) Inventors: Hidehisa Takahashi, Amagasaki (JP); Tatsuya Ishikawa, Takarazuka (JP); Kazuhiro Namba, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 164 days.

(21) Appl. No.: 10/157,789

(22) Filed: May 28, 2002

(65) Prior Publication Data

US 2002/0183117 A1 Dec. 5, 2002

(30) Foreign Application Priority Data

May 29, 2001 (JP) .................................. 2001-161342

(51) Int. Cl.[7] .............................................. A63F 9/24
(52) U.S. Cl. ........................... 463/42; 463/40; 463/29; 463/23
(58) Field of Search ............................ 463/29, 40, 41, 463/42, 23

(56) References Cited

U.S. PATENT DOCUMENTS

| | | | | |
|---|---|---|---|---|
| 6,009,458 A | * | 12/1999 | Hawkins et al. | 709/203 |
| 6,119,229 A | | 9/2000 | Martinez et al. | 713/200 |
| 6,352,479 B1 | * | 3/2002 | Sparks, II | 463/42 |
| 6,519,629 B2 | * | 2/2003 | Harvey et al. | 709/204 |
| 6,631,522 B1 | * | 10/2003 | Erdelyi | 725/53 |
| 6,640,284 B1 | * | 10/2003 | Shaw et al. | 711/129 |
| 6,641,481 B1 | * | 11/2003 | Mai et al. | 463/42 |
| 6,677,968 B1 | * | 1/2004 | Appelman | 345/853 |
| 2002/0116458 A1 | * | 8/2002 | Bricklin et al. | 709/204 |

FOREIGN PATENT DOCUMENTS

| | | |
|---|---|---|
| EP | 1 031 912 | 8/2000 |
| EP | 1 078 667 | 2/2001 |
| JP | 2001-120841 | 5/2001 |
| KR | 2000-0054783 | 9/2000 |
| WO | WO 95/31061 | 11/1995 |
| WO | WO 00/29084 | 5/2000 |
| WO | WO 00/44458 | 8/2000 |

\* cited by examiner

*Primary Examiner*—Jessica J. Harrison
(74) *Attorney, Agent, or Firm*—Jordan and Hamburg LLP

(57) ABSTRACT

The present invention provides a server device for net games which can increase the acquaintances of the user through net games, give sufficient excitement to the user, and can run net games smoothly by improving the enthusiasm of users to participate in these games. A lobby server 13 stores profile information for each member when each member accesses using a client computer 2, and at the end of the encounter league, in which profile information is invariably exchanged, the lobby server 13 enables the stored profile information of one member to be read at the client computer 2 of the other member, and enables the stored profile information of the other member to be read at the client computer 2 of the first member.

8 Claims, 30 Drawing Sheets

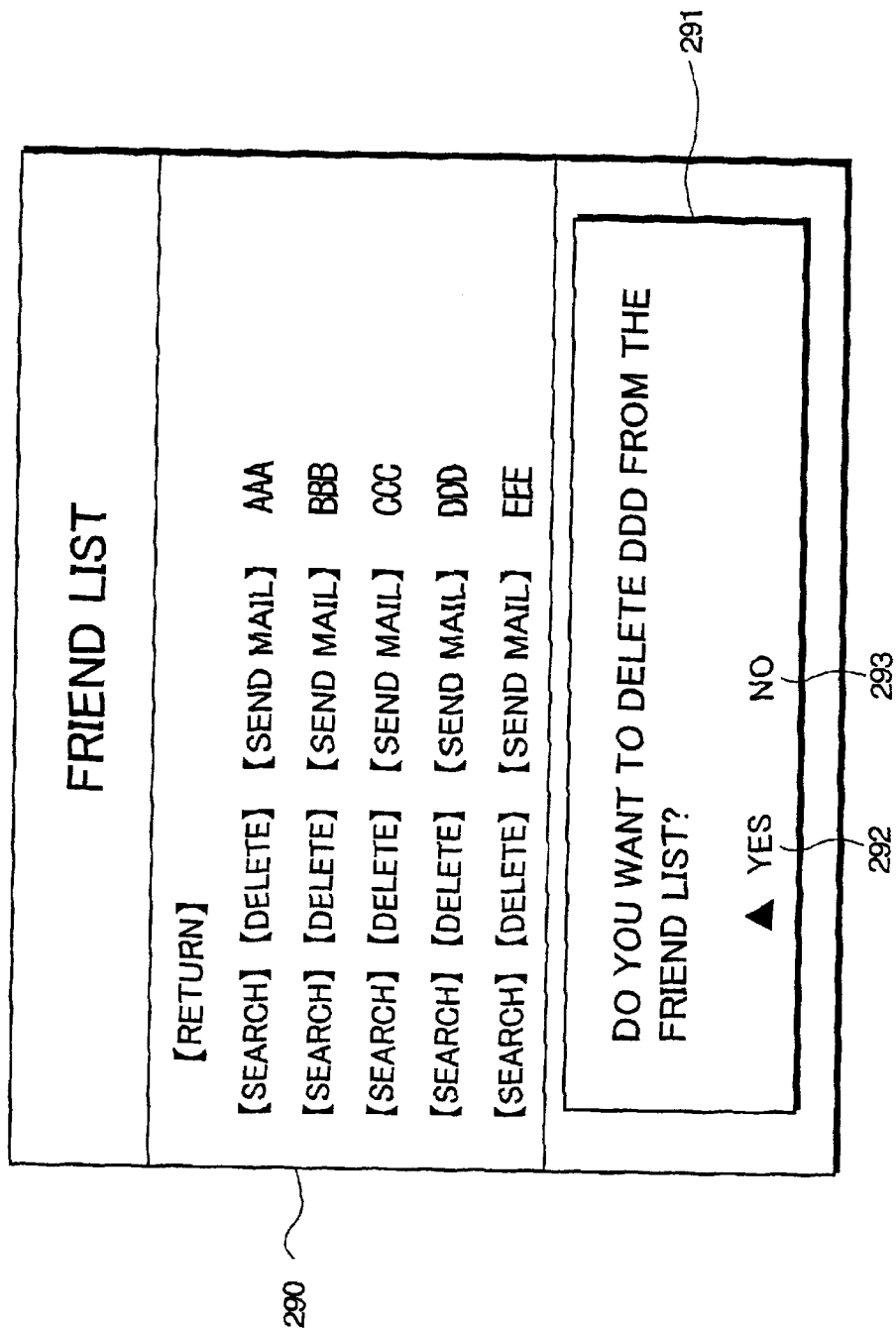

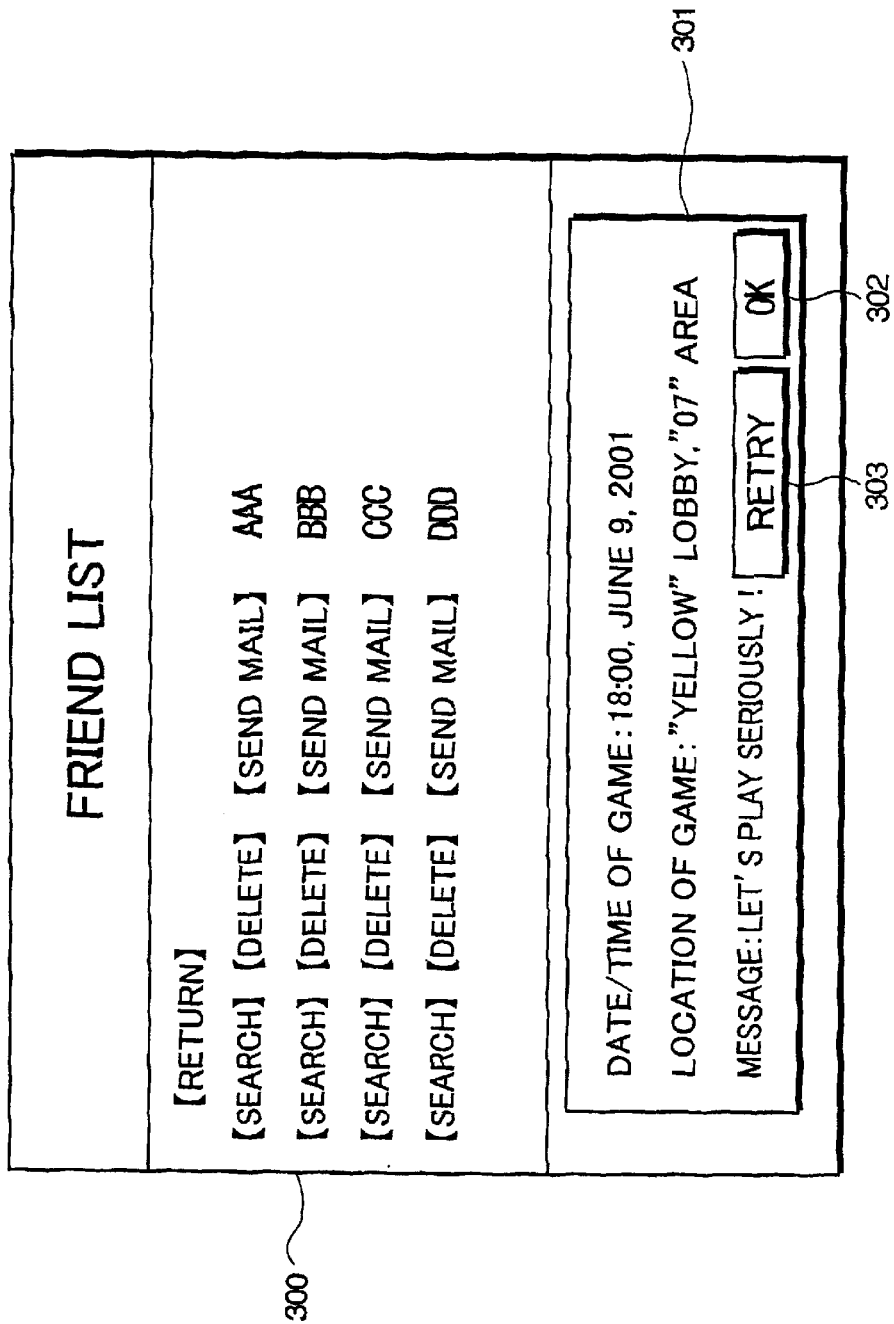

SERVER DEVICE FOR NET GAME, NET GAME MANAGEMENT METHOD, NET GAME MANAGEMENT PROGRAM AND RECORDING MEDIUM WHICH STORES NET GAME MANAGEMENT PROGRAM

BACKGROUND OF THE INVENTION

1. Field of the Invention

The present invention relates to a server device for net games (or network games) which is communicably connected via a network to a plurality of terminal devices used by users so that the users manage a game played in a game space using the terminal devices, a net game management method, a net game management program used in this device and a recording medium which stores a net game management program.

2. Description of the Related Art

Today, as the Internet becomes popular and data transfer speeds increase, net games (or network games) using server devices for net games and terminal devices used by users which are connected via the Internet are commonly played. With such net games, various competitive games, including sports and physical combat, are played.

In the case of these competitive games, an unspecified number of general users can participate in a game since the Internet is used. When unknown users match in this way, the abilities and so on of an opponent in a game are unknown, so unexpectedness is added to the progress of a game, and a constant level of excitement can be added to a game compared with normal games which use a standalone game machine, where a game is played with the game machine as the opponent.

However, when merely competing with an unspecified number of general players, as mentioned above, it is difficult to acquire information about an opponent, or to make friends with an opponent. In other words, even if the user participates in the same net game a plurality of times, in most cases the opponent is different each time, and becoming acquainted with individuals through net games is impossible. Therefore sufficient excitement cannot be provided to the user compared with the case when the user plays consecutive games with a specific opponent.

Also a net game has a characteristic in that a user can participate voluntarily, so even if a user accesses to play a net game, another user to be an opponent may not access, and the user may have to wait for a long time until starting the game, and in some cases the other user to be the opponent may never access. In such a case, the enthusiasm of the user participating in net games wanes, and net games cannot run smoothly.

SUMMARY OF THE INVENTION

To solve the above problems, it is an object of the present invention to provide a server device for net games which can increase the number of acquaintances of the user through not games, provide sufficient excitement to the user, and can run net games smoothly by improving the enthusiasm of the user to participate in the net games, and to provide a net game management method, and a net game management program using this device.

The present invention relates to a server device for net games which is communicably connected via a network to a plurality of terminal devices used by users so that the users manage a game played in a game space using the terminal devices. The server device comprises acquiring means for acquiring profile information of the user which is transmitted from the terminal device, and exchanging means by which profile information of one user acquired by the acquiring means can be read at the terminal device of the other user, and profile information of the other user acquired by the acquiring means can be read at the terminal device of the first user when the users play a game with profile exchange where profiles are invariably exchanged using the terminal devices.

According to the present invention described above, the server device for net games which is communicably connected via a network to a plurality of terminal devices used by users and manage a game played in a game space by the users using the terminal devices, comprises acquiring means for acquiring user profile information which is transmitted from the terminal device, and exchanging means by which the profile information of one user acquired by the acquiring means can be read at the terminal device of the other user, and the profile information of the other user acquired by the acquiring means can be read at the terminal device of the first user when the users play a game with profile exchange where profiles are invariably exchanged using the terminal devices.

In other words, when the user profile information which is sent from the terminal device is acquired and a game with profile exchange where the users invariably exchange profile information using the terminal devices is played, the acquired profile information of one user can be read at the terminal device of the other user, and the acquired profile information of the other user can be read at the terminal device of the first user.

In this way, the profile information of the opponents can be exchanged and read between the users who play the game with profile exchange, so that the users can know the profile information of each other. Also a player can be specified based on the profile information, so games can be played consecutively with a specified player. Also even if the opponent player has not accessed when one user accesses to play the net game, the user can request another user to play the game with whom he/she is acquainted through profile exchange, so the enthusiasm of the user to participate in net games can be improved.

These and other objects, features, and advantages of the present invention will become more apparent upon reading the following detailed description along with the accompanied drawings.

BRIEF DESCRIPTION OF THE DRAWINGS

FIG. 29 is a diagram depicting an example of the friend list operation screen containing the delete confirmation screen; and FIG. 30 is a diagram depicting an example of the friend list operation screen which displays a template to create an invitation mail.

DESCRIPTION OF THE PREFERRED EMBODIMENTS

Figure 1:
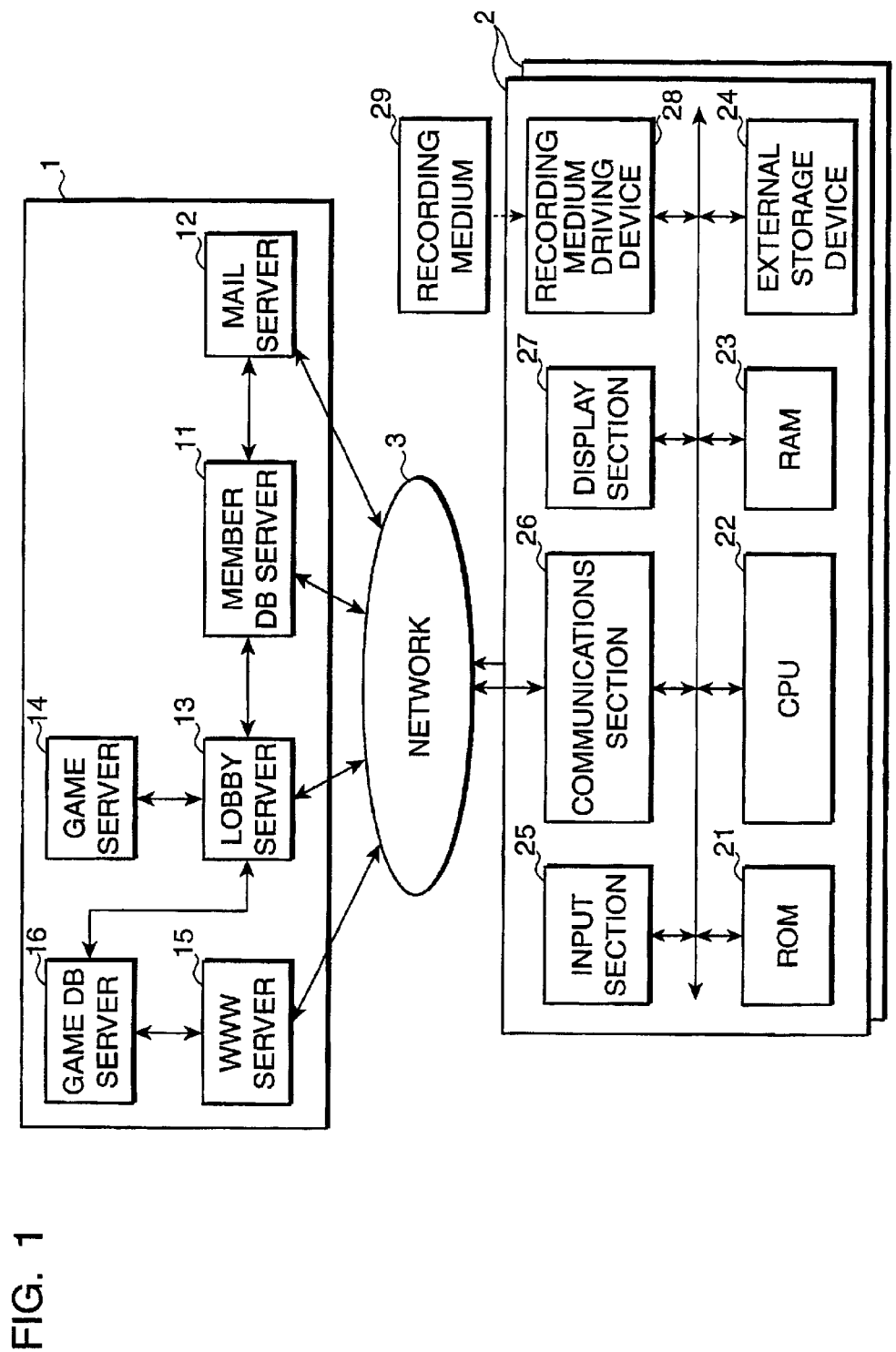
FIG. 1 is a block diagram depicting the configuration of the net game system using the server system according to an embodiment of the present invention.

A net game system using a server system according to an embodiment of the present invention will now be described with reference to the accompanying drawings. FIG. 1 is a block diagram depicting a configuration of a net game system using the server system according to an embodiment of the present invention.

In the following description, a baseball game in which pre-registered members compete is described as an example of a net game, but the present invention is not limited by this example, and can be suitably used for such games as other sports games, combat games, simulation games, shooting games and role playing games, as long as these net games are conducted with a plurality of players.

The net game system shown in FIG. 1 comprises a server system 1 and a plurality of client computers 2. The server system 1 and the plurality of client computers 2 are communicably inter-connected via a network 3. Each client computer 2 is a terminal device used by a member user, and the server system 1 is a server device for net games where a member manages a baseball game played in a game space using a client computer 2.

The Internet, for example, is used for the network 3, and various kinds of information is transmitted and received between the server system 1 and the client computers 2 according to TCP/IP (Transmission Control Protocol/Internet Protocol). The network 3 is not limited to the Internet, but another network, such as an intranet, or a network combining various networks including the Internet and an intranet may be used. The server system 1 and client computers 2 may be inter-connected by a leased line.

When the Internet is used as the network 3, each client computer 2 is usually connected to a predetermined provider server via a modem, and is connected to the network 3 via this provider server, but to simplify description, the provider server is neither illustrated nor described here.

In the present embodiment, the user who uses the client computer 2 is a member who has registered to receive a predetermined service provided by a company who manages the net game, and can play a baseball game as a net game with another member using the server system 1 and a client computer 2.

Here the net game has a normal game and an encounter league. A normal game is a profile exchange optional game where players can exchange profile information at will, and an encounter league is a game with profile exchange where players invariably exchange profile information.

Each member can voluntarily access the server system 1 using a client computer 2, and play a normal game and an encounter league in a game space constructed by the server system 1 and client computers 2, just like a normal baseball game. At this time, in the case of a normal game, profile information can be freely exchanged after play according to the wishes of the members, whereas in the case of an encounter league, profile information is compulsorily exchanged after the game.

Now the server system 1 will be described in detail. The server system 1 comprises a member DB (data base) server 11, mail server 12, lobby server 13, game server 14, WWW (World Wide Web) server 15, and game DB server 16. Each server is connected by a predetermined network such as a LAN (Local Area Network), so that data and the like can at least be transmitted and received according to the route, as illustrated. The member DB server 11, mail server 12, lobby server 13 and WWW server 15 are connected to the network 3 via a communication unit such as a router (not illustrated), for example.

The member DB server 11 is constituted by a normal data base server device, and executes member registration processing for a user when the user registers for membership to receive the predetermined service provided by the company who manages the network game. The member DB server 11 stores a member ID, password, and accounting information of each member which are decided during membership registration in the data base, and manages this information.

The mail server 12 is constituted by a normal mail server device, and manages the electronic mail of each member. For example, the mail server 12 sends an invitation mail to invite a member included in the friend list to play a game according to the instructions of a member, or sends a reply mail to the received invitation mail.

In the present embodiment, the mail server 12 manages the electronic mail of each member so that the above invitation mail is sent and received by creating the invitation mail in the mail box of each member in the mail server 12. However, if the electronic mail address of each member can be used (generally the electronic mail address of the electronic mail which is transmitted and received via the Internet), the above invitation mail may be sent directly to each member by normal electronic mail using this electronic mail address.

The lobby server 13 is constituted by a normal server device, and executes various kinds of lobby processing as a portal site when playing net games. For example, the lobby server 13 refers to the member ID and password stored in the member DB server 11 when the member accesses to play a net game using the client computer 2, and executes authentication processing for the accessed member.

The lobby server 13 guides the member confirmed as an official member by the authorization processing to the lobby selected by this member out of a plurality of lobbies, and in the lobby which the member was guided to, the lobby server 13 executes guide processing for guiding the member to the game area selected by this member out of a plurality of game areas, whereby the game is played in a game space of the game area to which the member is guided.

The lobby server 13 stores the profile information which each member sent using a client computer 2 in a normal game and an encounter league, and each member who exchanged profiles out of the members who have accessed the lobby server 13, holds the profile information of the other member so as to be readable.

The game server 14 is constituted by a normal server device, executes net game progression processing for progressing the net game in a game space where members compete, and transmits and receives data and the like required for the progression of the net game to and from the client computers 2 via the lobby server 13.

The game DB server 16 is constituted by a normal data base server device, and stores in the data base various kinds of information on the net games, such as match results sent by the client computers 2 via the lobby server 13, thereby managing this information. The game DB server 16 also manages the friend list, which is comprised of the opponents with whom profile information has been exchanged for each member.

The WWW server 15 is constituted by a normal WWW server device, creates ranking data from the data on match outcomes stored in the game DB server 16, and lists the created ranking data on a predetermined home page so that the ranking data can be read from the client computers 2.

Now the client computers 2 will be described in detail. Each client computer 2 is comprised of a normal personal computer, which includes a ROM (Read Only Memory) 21, CPU (Central Processing Unit) 22, RAM (Random Access Memory) 23, external storage device 24, input section 25, communications section 26, display section 27, and recording medium driving device 28.

Each block of the client computer 2 is connected to an internal bus, various data is inputted and outputted onboard the client computer 2 via this bus, and various kinds of processing for playing the net game are executed under the control of the CPU 22.

A basic program for operating the client computer 2 is stored in the ROM 21. The RAM 23 is used as the work area of the CPU 22. The recording medium 29 is a computer-readable recording medium such as a CD-ROM. The CD-ROM is provided by a software manufacturer who creates net games, and stores the game progression program and the like at the client side for a member to play a baseball game in the game space.

The recording medium driving device 28 is comprised of a CD-ROM drive, where the game progression program at the client side is read from the recording medium 29 under the control of the CPU 22, and the game progression program at the client side is installed in the external storage device 24.

The recording medium 29 is not limited to the above mentioned example, but if another recording medium driving device, such as a DVD drive or floppy disk drive, is added, the game progression program at the client side may be installed in the external storage device 24 using another computer-readable recording medium such as DVD or floppy disk. If the game progression program at the client side can be downloaded from the home page of a software manufacturer via a network 3, then the game progression program at the client side may be directly downloaded from this home page to the external storage device 24.

The external storage device 24 is comprised of an external storage device such as a hard disk drive. The game progression program at the client side is installed in the external storage device 24 as above, and various programs, such as a moving picture reproduction program for reproducing 3-dimensional moving pictures in accordance with the game progression program, are preinstalled by a normal method. Here for the moving picture reproduction program, Direct X by Microsoft, for example, can be used.

The CPU 22 reads a basic program from the ROM 21, and reads the game progression program at the client side and the moving picture reproduction program from the external storage device 24, executes game progression processing to play a normal game and an encounter league, and transmits and receives necessary data to and from the server system 1 via the communications section 26.

The input section 25 is comprised of a keyboard and mouse, and in the present embodiment, various instructions are input primarily using the mouse according to the operation of the member. The communications section 26 is comprised of a modem or a router, and controls communications with the server system 1 via the network 3. The display section 27 is comprised of a CRT (Cathode Ray Tube) or liquid crystal display, and displays various screens used for a net game as still pictures or moving pictures under the control of the CPU 22.

Figure 2:
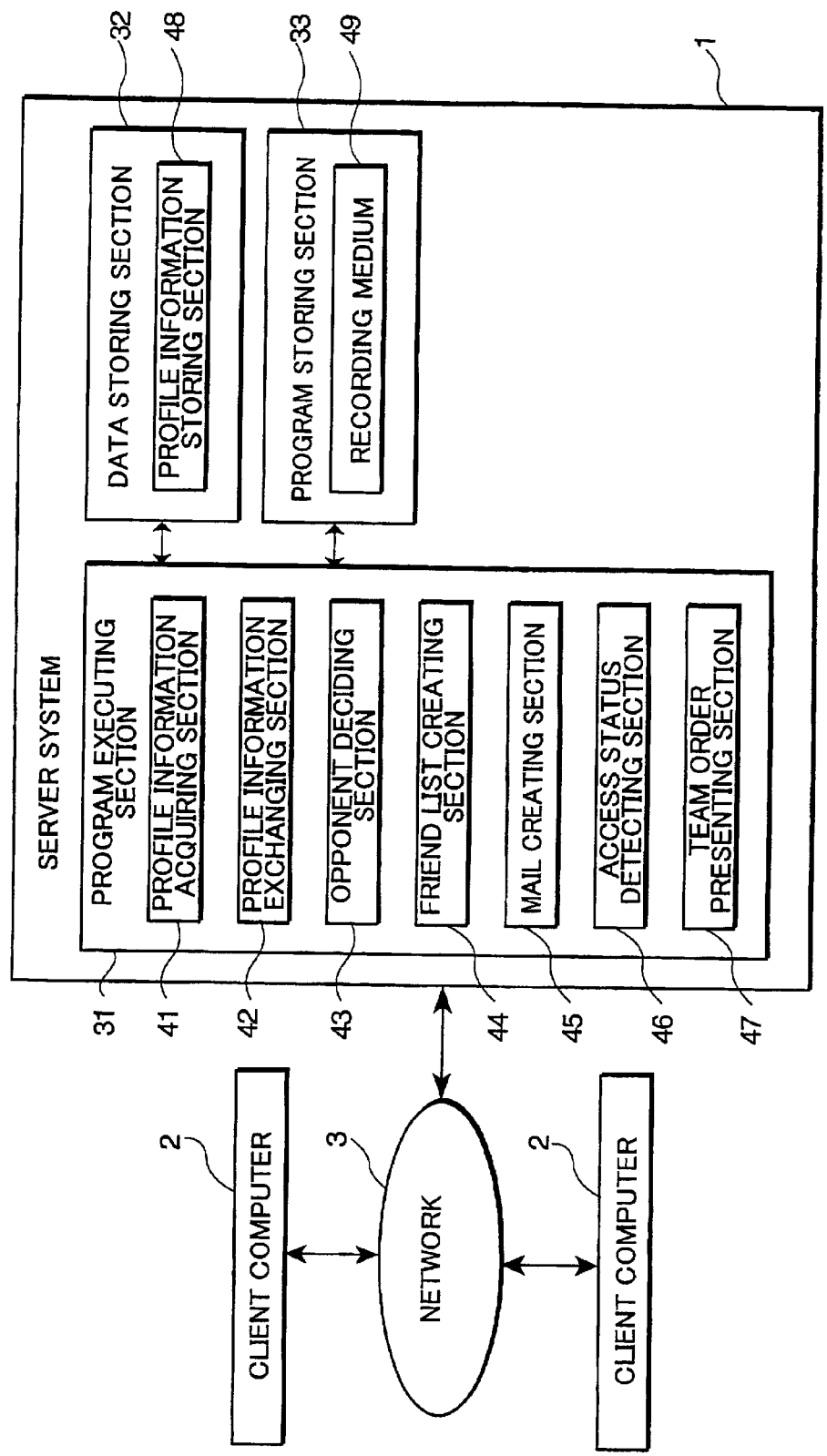
FIG. 2 is a block diagram depicting the main functions of the server system shown in FIG. 1.

Now the major functions of the server system 1 configured as above will be described. FIG. 2 shows the major functional blocks of the server system 1 shown in FIG. 1.

As FIG. 2 shows, the server system 1 functionally includes a program executing section 31, data storing section 32, and program storing section 33. The program executing section 31 functionally includes the profile information acquiring section 41, profile information 11 exchanging section 42, opponent deciding section 43, friend list creating section 44, mail creating section 45, access status detecting section 46, and team order presenting section 47. The data storing section 32 functionally includes a profile information storing section 48. The program storing section 33 includes a computer-readable recording medium 49.

The program executing section 31 is comprised of the CPUs (not illustrated) of each server 11–16 of the server system 1, and functions as the profile information acquiring section 41, profile information exchanging section 42, opponent deciding section 43, friend list creating section 44, mail creating section 45, access status detecting section 46, and team order presenting section 47, by the CPUs' reading various programs stored in the recording medium 49, and executing the programs.

The data storing section 32 is comprised of a RAM (not illustrated) of the lobby server 13. The profile information storing section 48 stores the profile information for each member, sent by a member using a client computer 2 while the client computer 2 of the member is connected to the lobby server 13.

The program storing section 33 is comprised of the hard disk drive (not illustrated) of each server 11–16 of the server system 1, for example, and in this case, the recording medium 49 is comprised of a hard disk. The recording medium 49 records a profile information acquisition program, encounter league progression program, normal game progression program, friend list management program, and other game progression programs at the server side as net game management programs in a computer-readable state.

The recording medium 49 is not limited to the above example, but other computer-readable recording mediums such as CD-ROM, DVD and floppy disk, may be used if other recording medium driving devices, such as a CD-ROM drive, DVD drive and floppy disk drive, are useable, and each of the above programs may be downloaded via the network 3 and stored in the hard disk or the like.

The profile information acquiring section 41 is implemented primarily by the CPU of the lobby server 13 executing the profile information acquisition program. The profile information acquiring section 41 acquires the profile information of a member which is transmitted from the client computer 2, and has the profile information storing section 48 store the acquired profile information for each member.

The profile information exchanging section 42 is implemented primarily by the CPU of the lobby server 13 executing the encounter league progression program. When the encounter league ends, the profile information exchanging section 42 allows the profile information of one member stored in the profile information storing section 48 to be read at the client computer 2 of the other member, and allows the profile information of the other member stored in the profile information storing section 48 to be read at the client computer 2 of the first member.

The opponent deciding section 43 is implemented primarily by the CPU of the lobby server 13 executing the encounter league progression program. The opponent deciding section 43 decides the opponent of the encounter league from the other members according to the screening conditions set by the member using the client computer 2.

The friend list creating section 44 is implemented primarily by the CPU of the game DB server 16 executing the friend list management program. The friend list creating section 44 creates a friend list, which consists of members for whom profile information is exchanged by the profile information exchanging section 42.

The mail creating section 45 is implemented primarily by the CPU of the mail server 12 executing the friend list management program. The mail creating section 45 allows the invitation mail, which is mail for a member to make a request for a game to an opponent selected using the client computer 2 from the friend list created by the friend list creating section 44, to be read at the client computer 2 of the opponent.

The access status detecting section 46 is implemented primarily by the CPU of the lobby server 13 executing the friend list management program. The access status detecting section 46 detects the status of access to the server system 1 of the client computer 2 of a member included in the friend list created by the friend list creating section 44.

The team order presenting section 47 is implemented primarily by the CPU of the lobby server 13 executing the encounter league progression program. The team order presenting section 47 presents to the client computer 2 the player order of the team which the member to be an opponent will use for the game.

In the present embodiment, the lobby server 13 corresponds to the acquiring means, exchanging means, deciding means, detecting means, and order presenting means. The game DB server 16 corresponds to the list creating means, and the mail server 12 corresponds to the mail creating means.

Now operation of the net game system configured as mentioned above will be described. In the following description, it is assumed that the user has completed member registration to the member DB server 11, and the member ID and password of the member have been stored in the external storage device 24 of the client computer 2 to be used by the member, and have also been stored in and are being managed by the member DB server 11. Playing a net game requires a fee, and it is assumed that the accounting status shows that the member has already paid a predetermined fee, and has the right to play the net game.

First, when the member initializes the game progression program at the client side using the mouse of the input section 25 of the client computer 2, the mode select screen for the member to select a desired mode from a plurality of modes is displayed on the display section 27.

Figure 3:
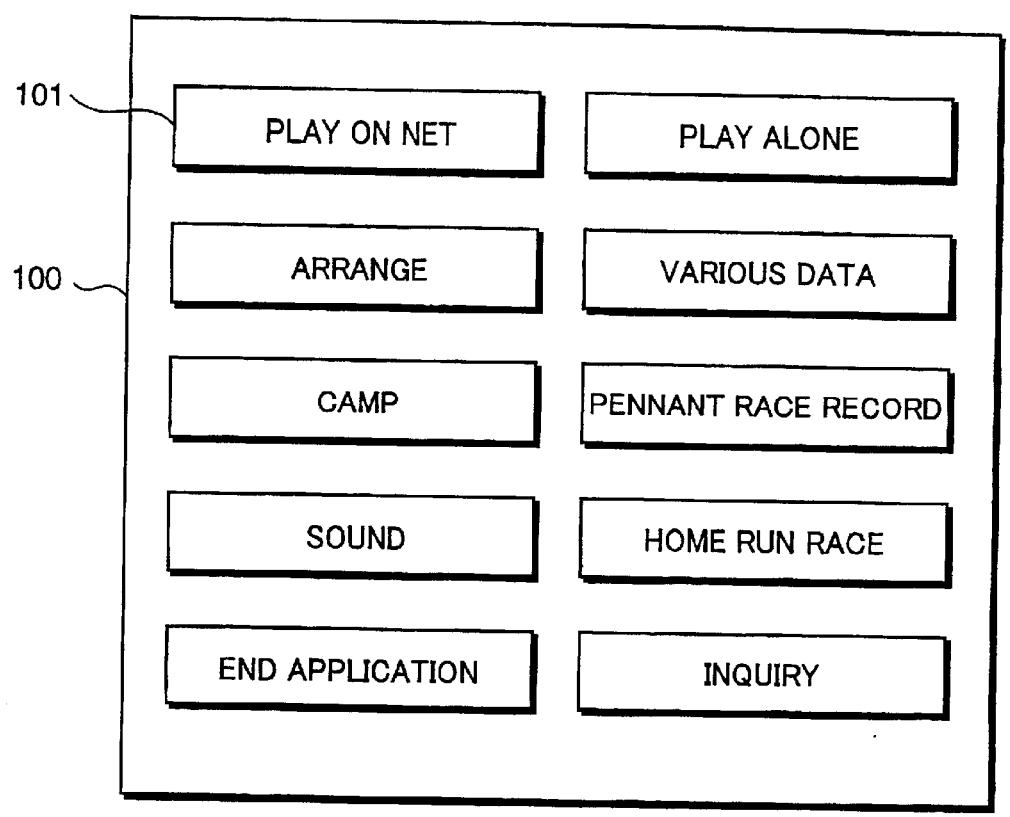
FIG. 3 is a diagram depicting an example of the mode select screen.

FIG. 3 is a diagram depicting an example of the mode select screen. When the mode select screen 100 shown in FIG. 3 is displayed and the member selects the "Play on Net" button 101 using the mouse, the sub-menu screen for the member to select a net game from a plurality of items of the sub-menu is displayed on the display section 27.

Figure 4:
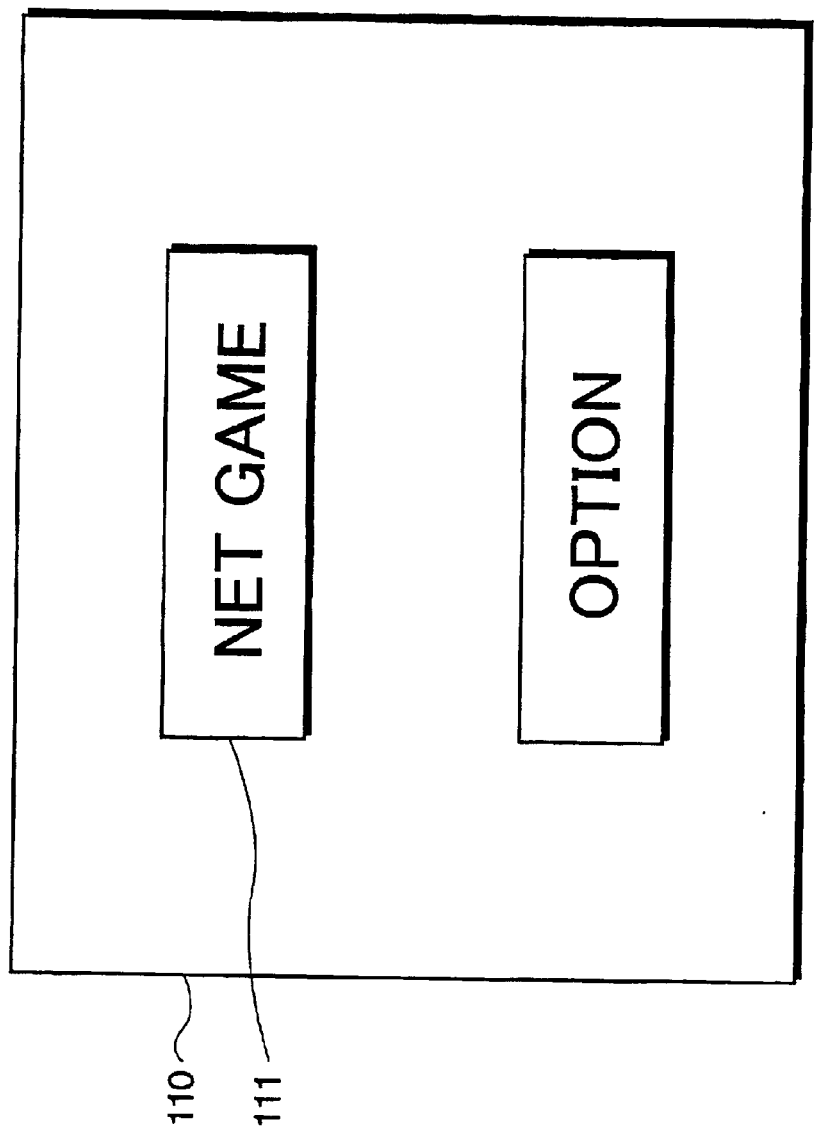
FIG. 4 is a diagram depicting an example of the sub-menu screen.

FIG. 4 is a diagram depicting an example of the sub-menu screen. When the sub-menu screen 110 shown in FIG. 4 is displayed, and the member selects the "Net Games button" 111 using the mouse, the profile information acquisition processing described below starts.

Figure 5:
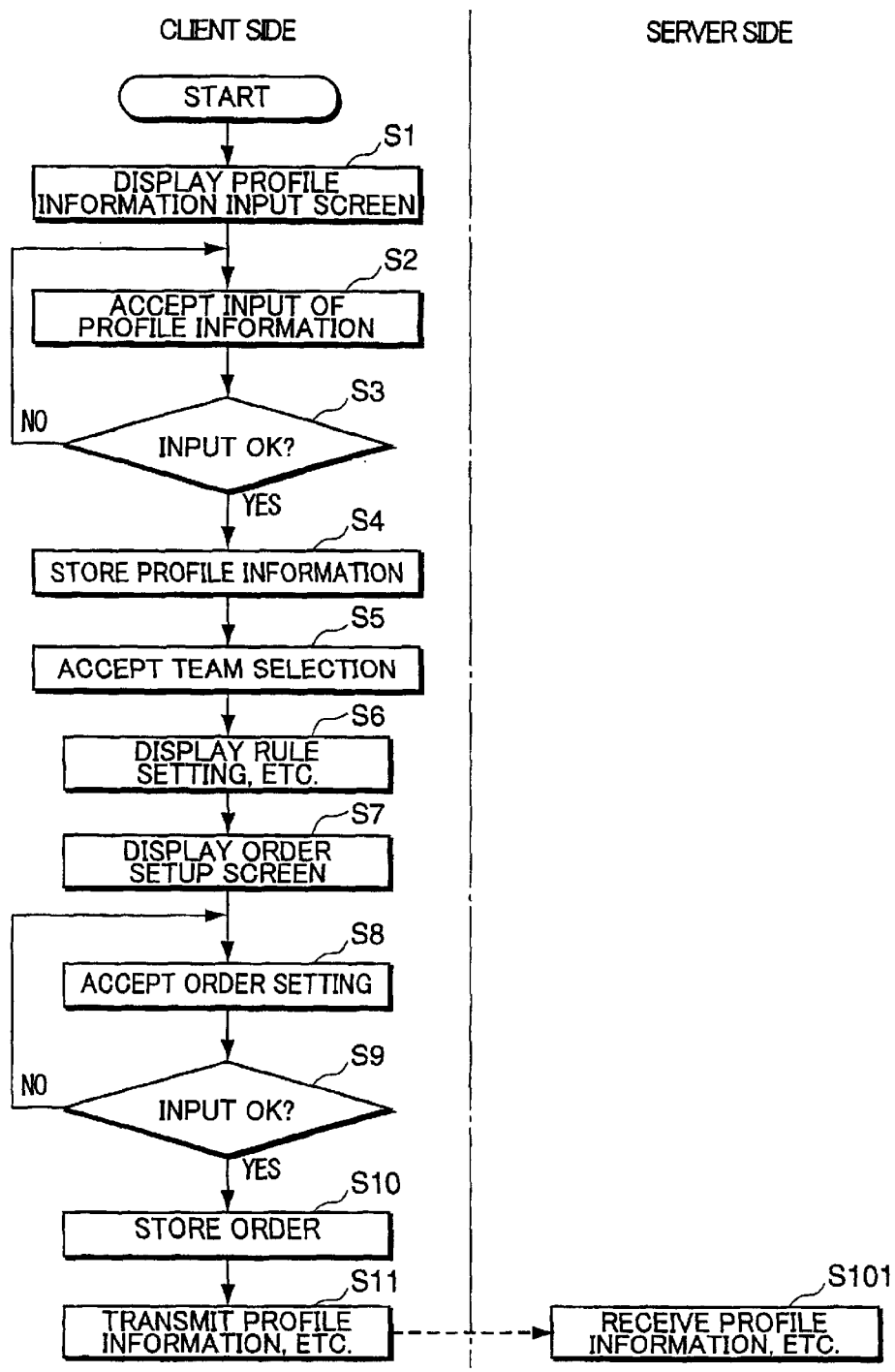
FIG. 5 is a flow chart depicting an example of profile information acquisition processing by the server system and client computer shown in FIG. 1.

FIG. 5 is a flow chart depicting an example of the profile information acquisition processing by the server system 1 and client computer 2 shown in FIG. 1. The profile information acquisition processing at the client computer 2 side is processing implemented by the CPU 22 executing the game progression programs, and the message acquisition processing at the server system 1 side is processing implemented by the lobby server 13 executing the profile information acquisition program.

As FIG. 5 shows, in Step S1, the CPU 22 of the client computer 2 displays the profile information input screen on the display section 27 for the member to input profile information.

Figure 6:
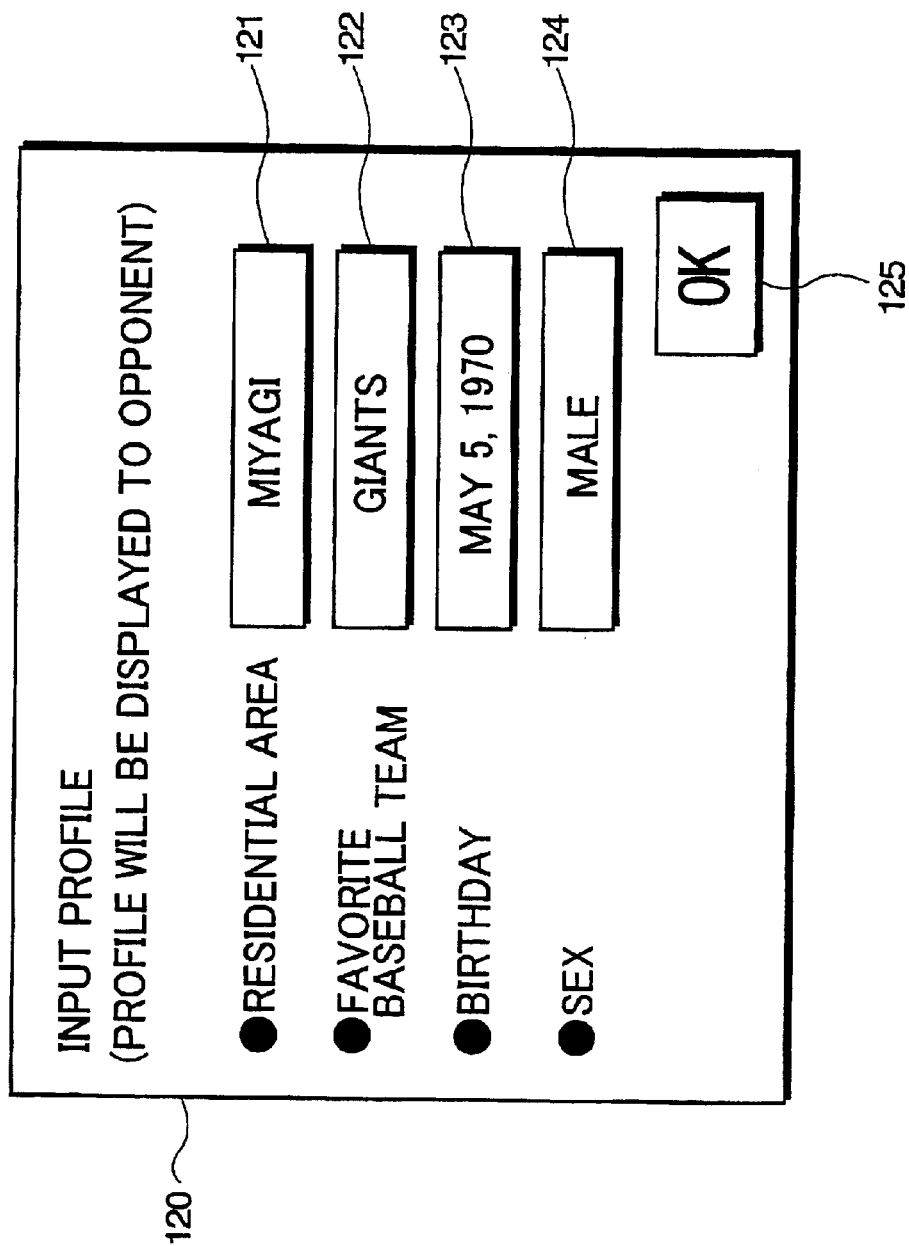
FIG. 6 is a diagram depicting an example of the profile information input screen.

FIG. 6 is a diagram depicting an example of the profile information input screen. For example, the profile information input screen 120 shown in FIG. 6 is displayed, and each input box 121–124 for the residential area, favorite baseball team, birth date and sex, which are pieces of profile information, are displayed. In the residential area input box 121, one prefecture is inputted as the residential area of the member, in the favorite baseball team input box 122, one team is inputted out of the twelve baseball teams of the A League and B League, in the birth date input box 123, the birth date of the member is inputted, and in the sex input box 124, either male or female is inputted as the sex of the member.

When the member inputs the residential area, favorite baseball team, birth date, and sex respectively using the mouse of the input section 25, the CPU 22 accepts the inputted profile information and displays the information in each input box 121–124 in Step S2. In the example shown in FIG. 6, Miyagi Prefecture, the Giants, May 5, 1970, and male, are displayed respectively as the information of the residential area, favorite baseball team, birth date and sex, which becomes the profile information of this member. The profile information is not limited to the above mentioned example, but other information may be used if the information is related to the member.

Then in Step S3, the CPU 22 judges whether the member has completed input by selecting the "OK" button 125 shown in FIG. 6 using the mouse; if the "OK" button 125 has not been selected, processing returns to Step S2, and if the 'OK' button 125 has been selected, processing moves to Step S4.

When the "OK" button 125 is selected, in step S4, the CPU 22 stores the information on residential area, favorite baseball team, birth date, and sex, in the RAM 21 or external storage device 24, as profile information.

Then in Step S5, the CPU 22 displays the team select screen for selecting a team to be used for a normal game or friend league on the display section 27, and stores the team name which is selected by the member using the team selection screen in the RAM 21 or external storage device 24.

Then in Step S6, the CPU 22 sequentially displays each confirmation screen, such as rule setting and game setting, to be used for the net game, on the display section 27, and accepts confirmation by the member for the displayed rule setting and game setting. Here the rule setting is, for example, the number of innings in a match, whether extra innings will be played in a match, whether a game can be called, and whether the DH system is used, and the game setting is, for example, the wind status, weather status, match time zone, error occurrence display status, player condition status, and player injuries.

After the member confirms the rule setting and so on, in Step S7, the CPU 22 displays the order setup screen on the display section 27 for setting the player order of the team to be used by the member in the net game.

Figure 7:
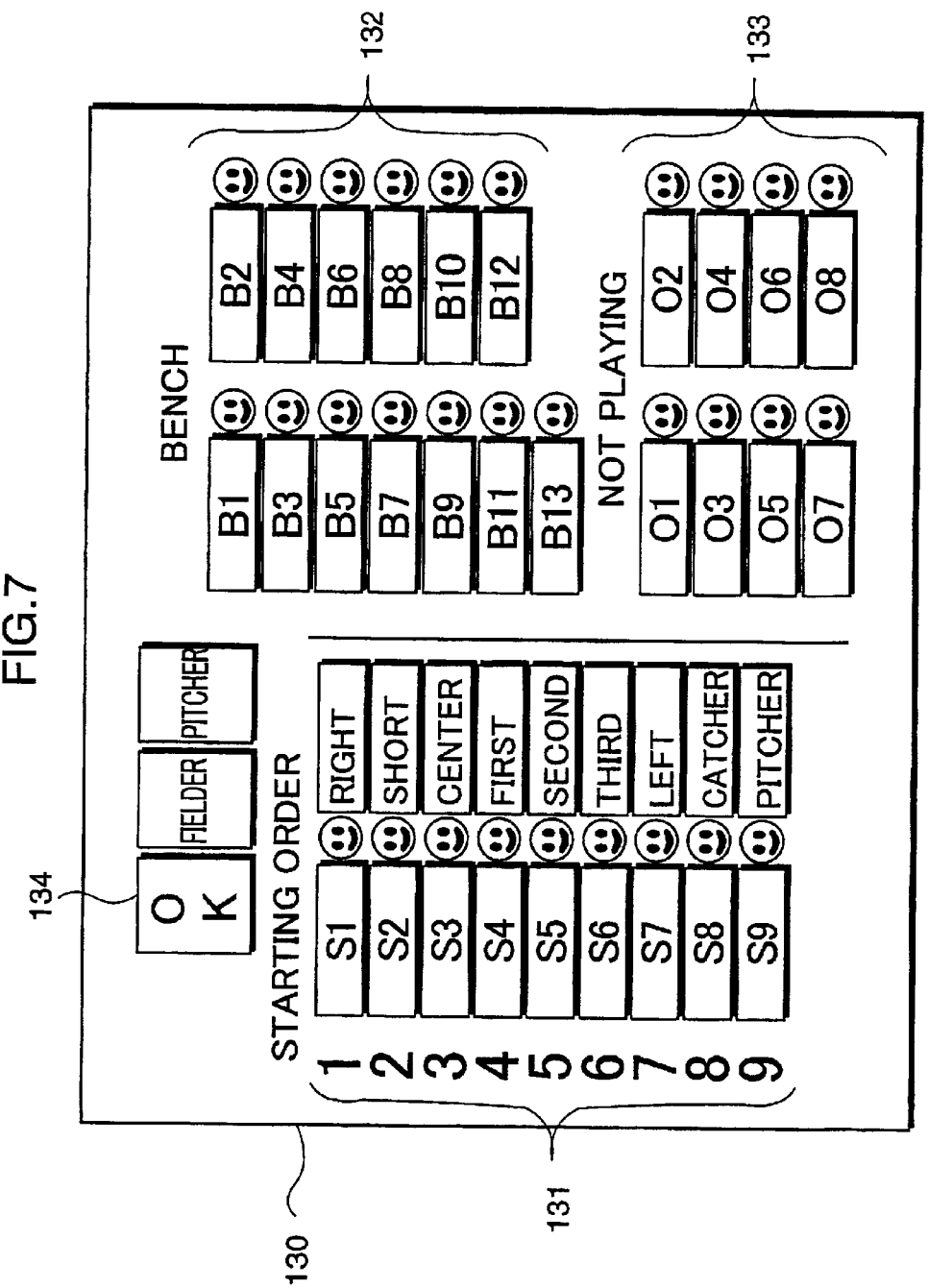
FIG. 7 is a diagram depicting an example of the order setup screen.

FIG. 7 is a diagram depicting an example of the order setup screen. For example, the order setup screen 130 shown in FIG. 7 is displayed on the display section 27. When the member inputs the starting order 131, players on the bench 132, and players who are not playing 133 using the mouse or keyboard, the CPU 22 accepts and displays the inputted information on the starting order 131, players on the bench 132, and players who are not playing 133 in step S8. S1–S9, B1–B13 and 01–08 in FIG. 7 indicate the respective player names.

Then, in Step S9, the CPU 22 judges whether the member has completed input by selecting the "OK" button 134 shown in FIG. 7 using the mouse; if the "OK" button 134 has not been selected, processing returns to Step S8, and if the "OK" button 134 has been selected, processing moves to Step S10.

When the "OK" button 134 is selected, the CPU 22 stores the information on the starting order 131, players on the bench 132, and players who are not playing 133 in the RAM 21 or external storage device 24 in Step S10.

Then, in Step S11, the client computer 2 accesses the lobby server 13 via the network 3. When a network connection is established between the client computer 2 and the lobby server 13, the CPU 22 sends the member ID and password stored in the external storage device 24 to the lobby server 13 using the communications section 26, and sends the profile information and such information as team name and player order of the team stored in the RAM 21 or external storage device 24 to the lobby server 13.

Then in Step S101, the lobby server 13 receives such transmitted information as profile information, and inquires with the member DB server 11 whether the member to whom the received member ID and password are assigned has the right to play the game. The member DB server 11 checks the accounting information of the member specified by the member ID and password, and notifies the lobby server 13 of the result of whether the member has the right to play the game.

In this case, the member has the right to play the game, so the member DB server 11 notifies the lobby server 13 that the member has the right to play the game, and the lobby server 13 stores the received profile information in the RAM for each member, and stores the information on team name and player order of the team and the like in the game DB server 16, whereby profile information acquisition processing ends.

In this way, according to the present embodiment, various information, including profile information, is all sent to the server system 1 after all setup processing ends, so the connection time between the server system 1 and client computer 2 can be decreased, and unnecessary accounting fees are not charged.

When profile information acquisition processing ends, the lobby server 13 sends the data for displaying the game lobby select screen to select a desired game lobby to the client computer 2.

Figure 8:
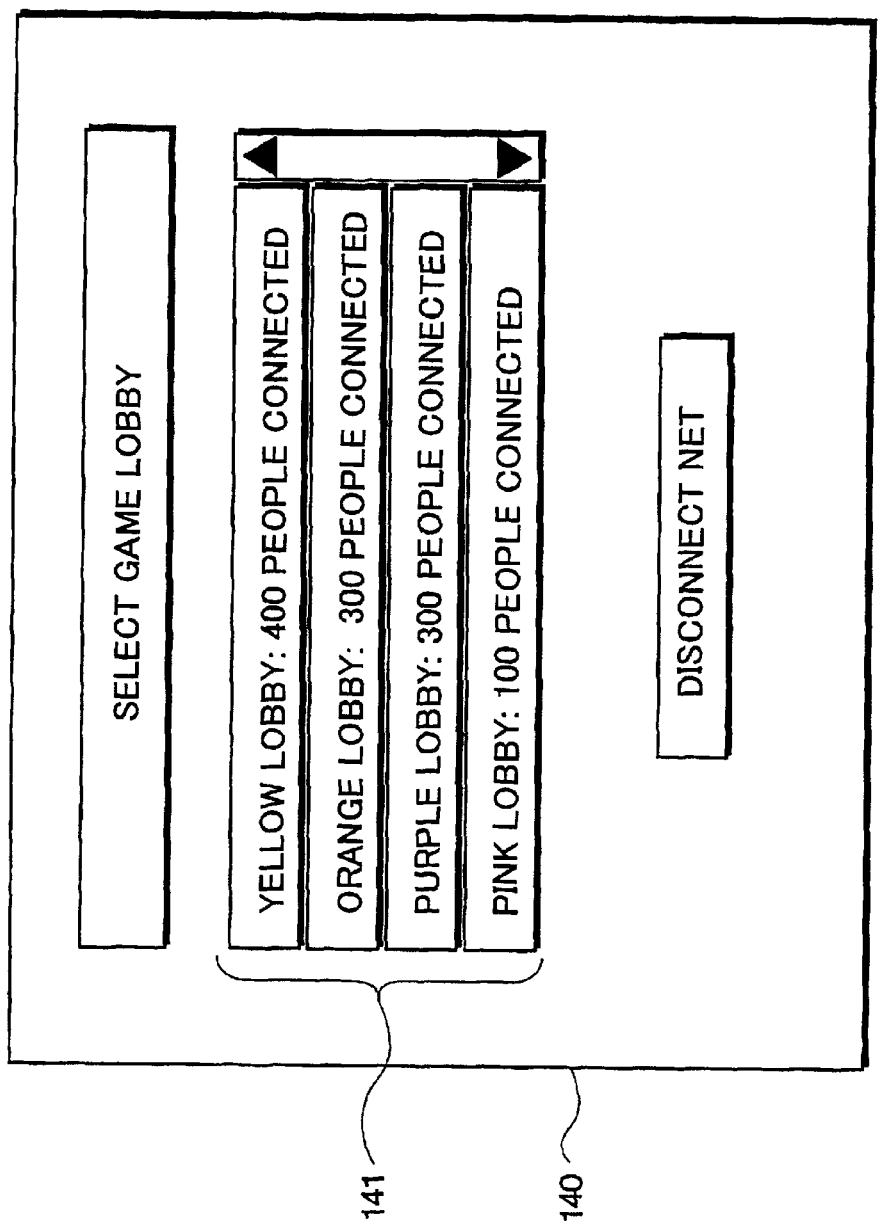
FIG. 8 is a diagram depicting an example of the game lobby select screen.

FIG. 8 is a diagram depicting an example of the game lobby select screen. The client computer 2 displays the game lobby select screen 140 shown in FIG. 8, for example, on the display section 27 using the received data, where a plurality of game lobby select buttons 141 are displayed.

The name of each game lobby and the number of members in each game lobby is displayed on the select button 141 of each game lobby. If the member selects a desired game lobby select button from the plurality of game lobby select buttons 141 using the mouse at this time, the lobby server 13 sends data to the client computer 2 for displaying the game area select screen to select a desired game area out of a plurality of game areas.

Figure 9:
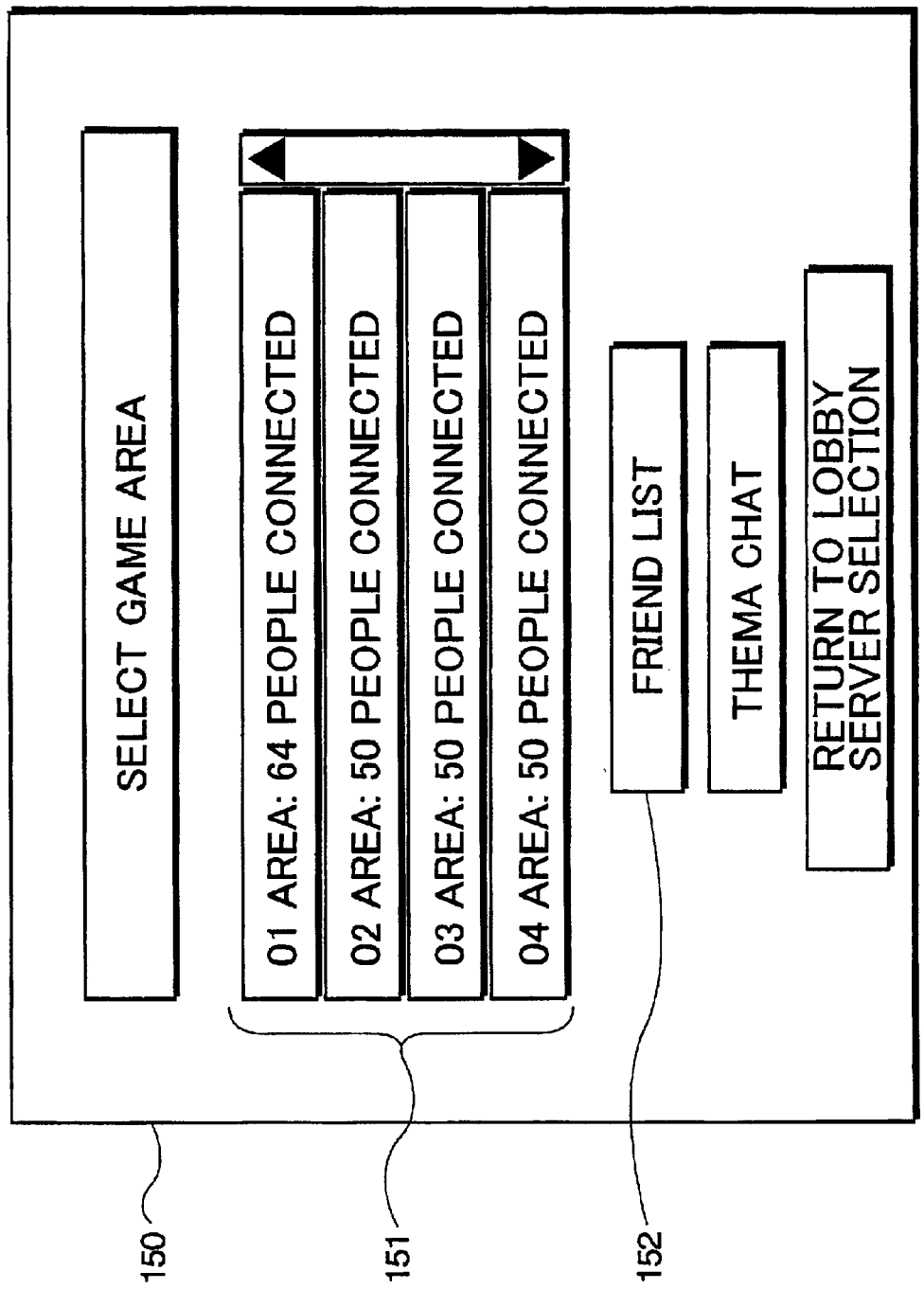
FIG. 9 is a diagram depicting an example of the game area select screen.

FIG. 9 is a diagram depicting an example of the game area select screen. The client computer 2 displays the game area select screen 150 shown in FIG. 9 on the display section 27 using the received data, where a plurality of game area select buttons 151 are displayed.

The name of each game area and the number of members in each game area is displayed on each game area select button 151. When the member selects a desired game area select button from the plurality of game area select buttons 151 using the mouse, the CPU 22 displays the game mode select screen for selecting the game mode on the display section 27.

Figure 10:
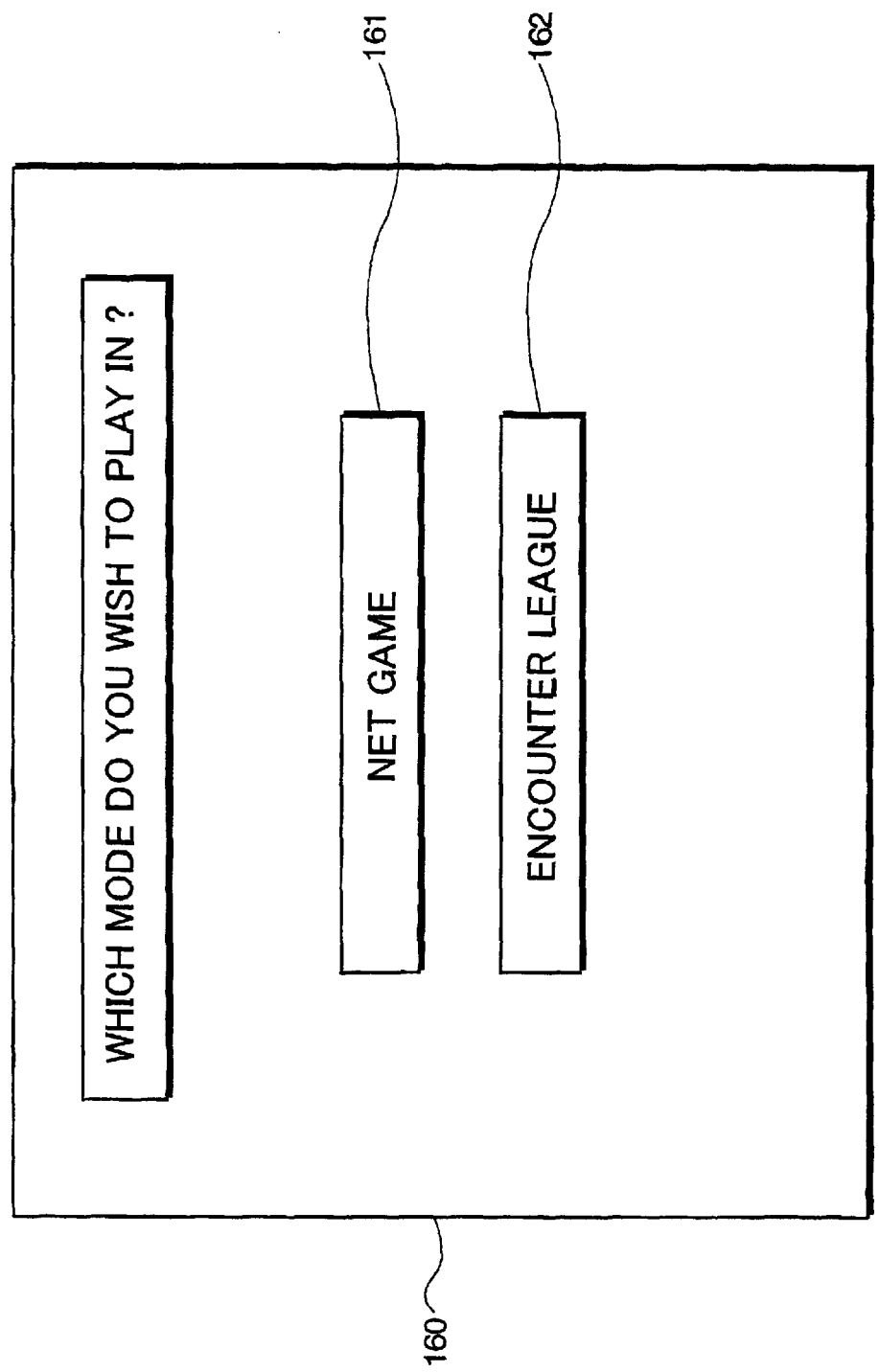
FIG. 10 is a diagram depicting an example of the game mode select screen.

FIG. 10 is a diagram depicting an example of the game mode select screen. For example, when the game mode select screen 160 shown in FIG. 10 is displayed, and the member selects the "Encounter League" button 162 using the mouse, the encounter league progression processing, to be described below, starts.

Figure 11:
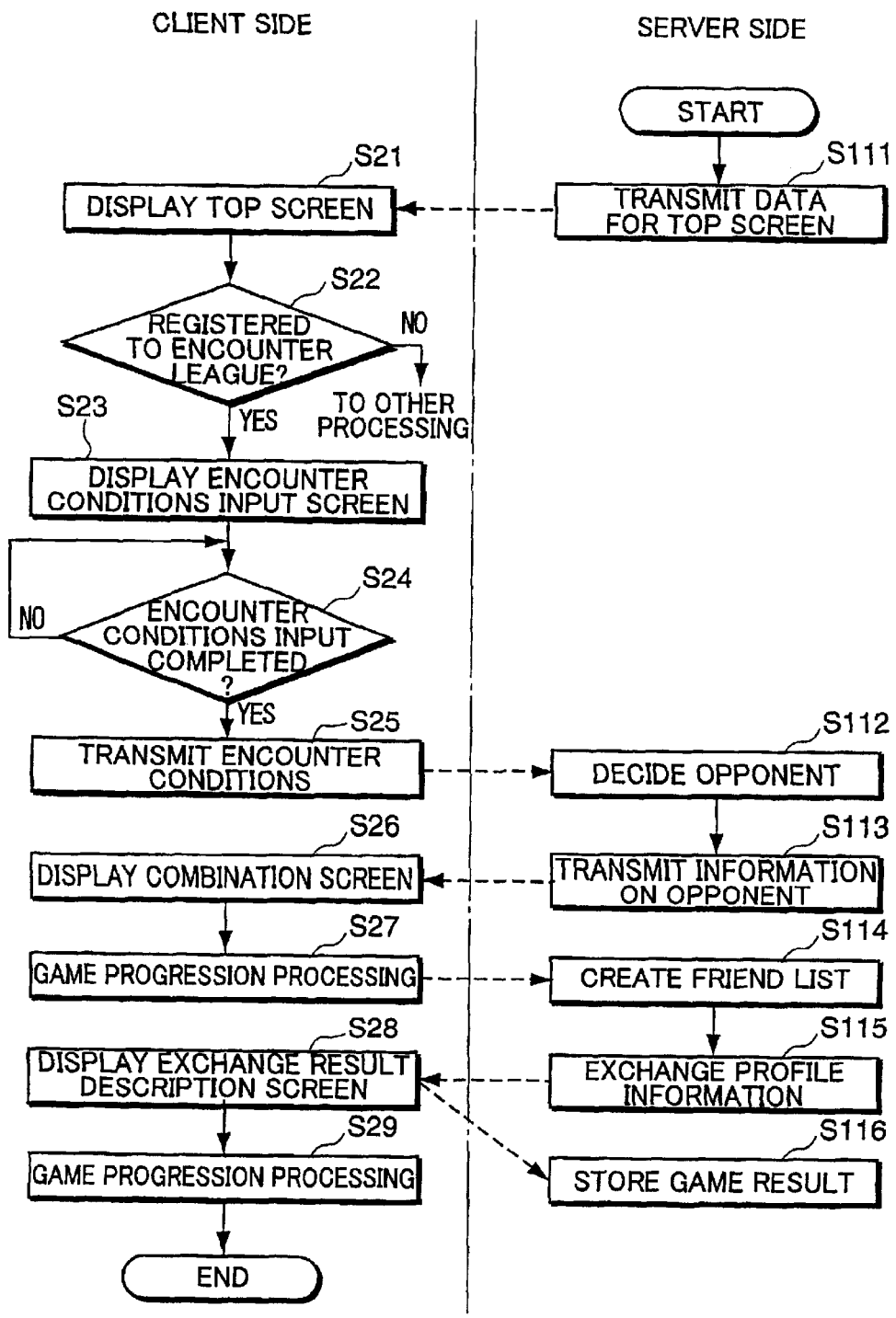
FIG. 11 is a flow chart depicting an example of encounter league progression processing by the server system and client computer shown in FIG. 1.

FIG. 11 is a flow chart depicting an example of the encounter league progression processing by the server system 1 and client computer 2 shown in FIG. 1. The encounter league progression processing at the client computer 2 side is implemented by the CPU 22 executing the game progression program, and the encounter league progression processing at the server system 1 side is implemented by the lobby server 13 executing the encounter league progression program.

As FIG. 11 shows, in Step S111, the lobby server 13 sends data for displaying the encounter league top screen to the client computer 2.

Figure 12:
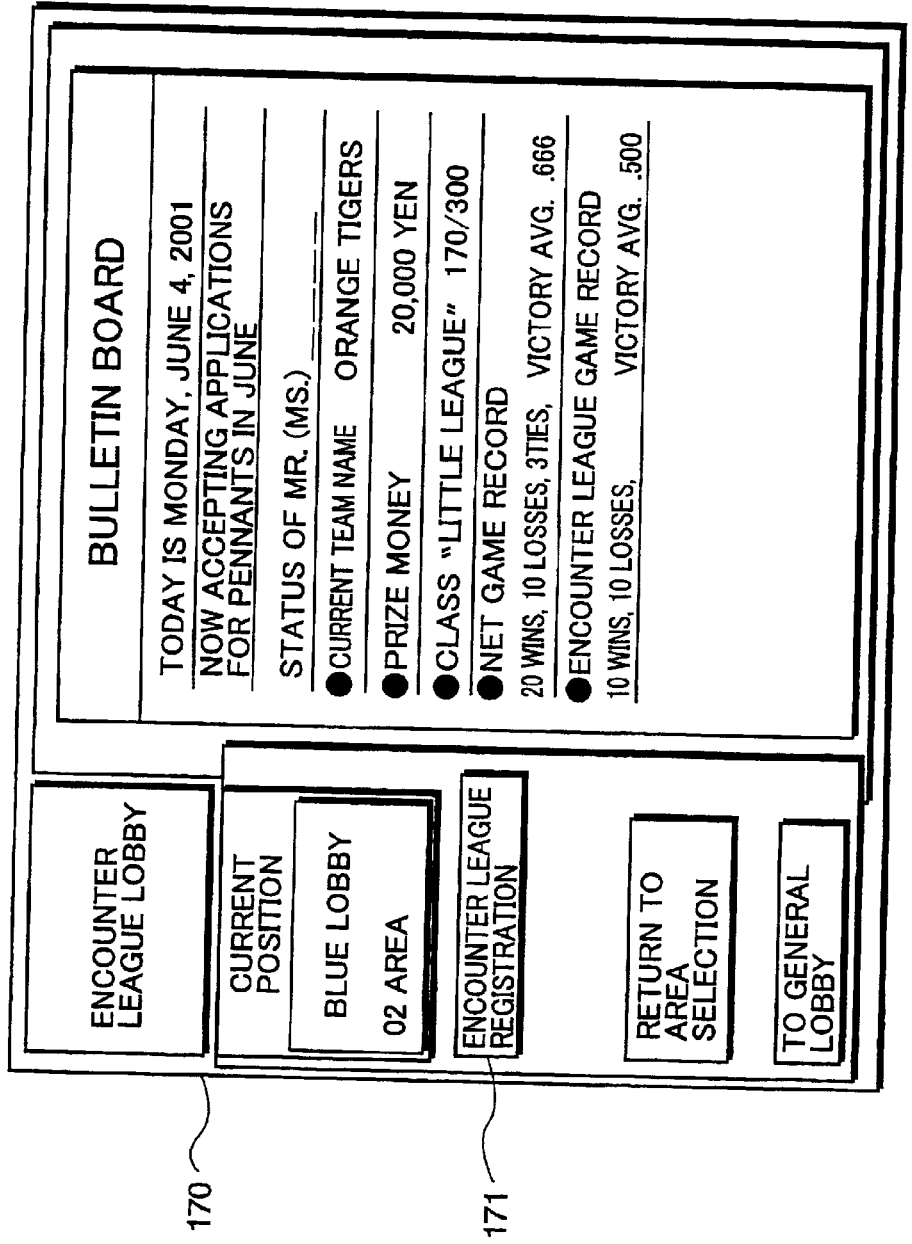
FIG. 12 is a diagram depicting an example of the encounter league top screen.

Then in Step S21, the CPU 22 displays the encounter league top screen on the display section 27 using the transmitted data. FIG. 12 is a diagram depicting an example of the encounter league top screen. For example, the encounter league top screen 170 shown in FIG. 12 is displayed.

Then in Step S22, the CPU 22 judges whether the member has registered to the encounter league by selecting the encounter League Registrations button 171 shown in FIG. 12 using the mouse of the input section 25; if the member has selected another command without registering to the encounter league, the CPU 22 executes processing according to the selected command, and if the member has registered to low the encounter league, processing moves to Step S23.

Then in Step S23, the CPU 22 displays on the display section 27 the encounter conditions input screen for inputting the encounter conditions to be the screening conditions to select an opponent.

Figure 13:
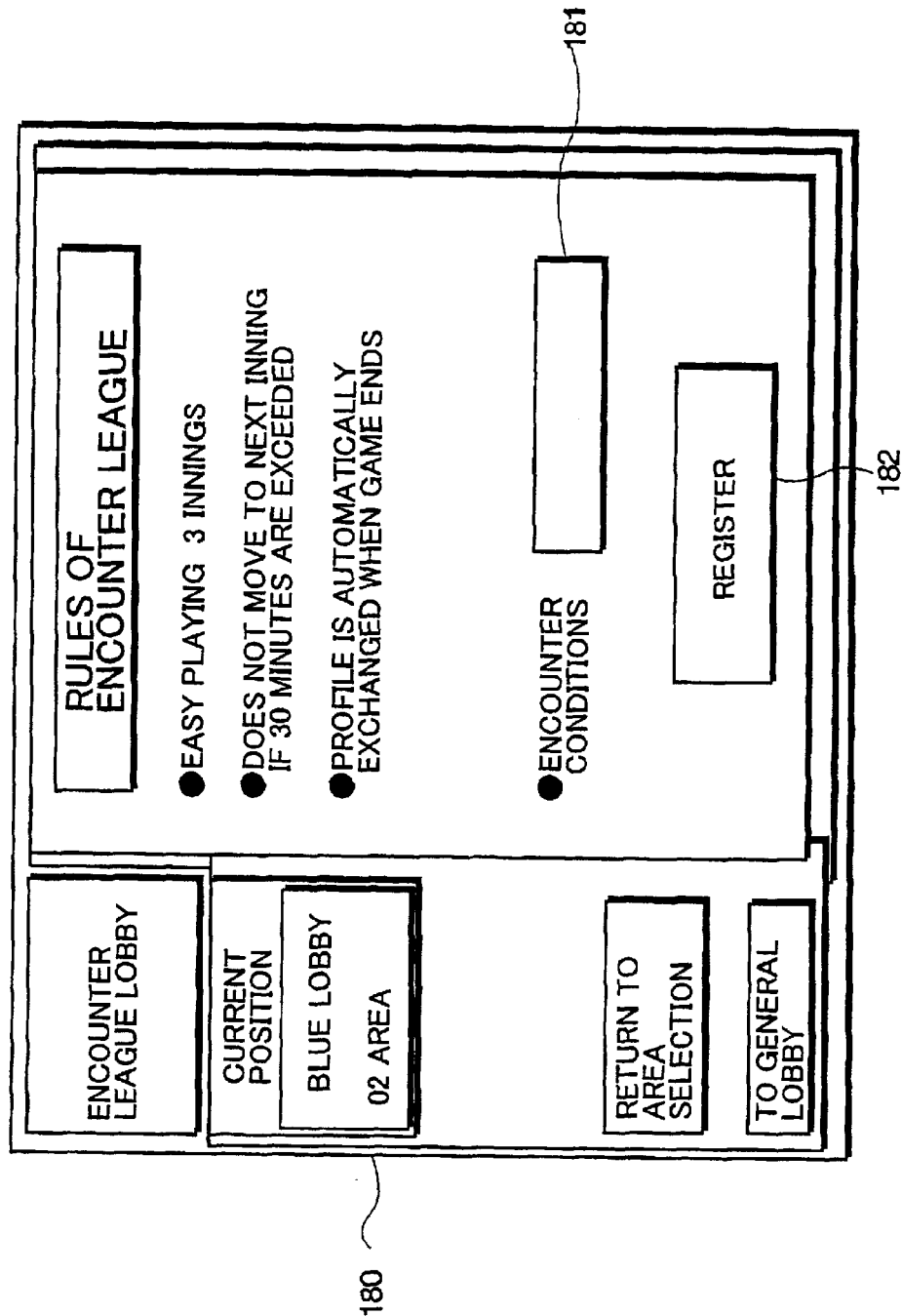
FIG. 13 is a diagram depicting an example of the encounter condition input screen.

FIG. 13 is a diagram depicting an example of the encounter conditions input screen. In the encounter conditions input screen 180 shown in FIG. 13, the rules of the encounter league are explained, and the input boxes 181 for the encounter conditions are displayed. In the present embodiment, the number of innings of a normal game is set to 9, and the game time thereof is set to a maximum of 90 minutes, for example, while the number of innings of the encounter league is limited to 3 innings, and the game time thereof is also limited to a maximum of 30 minutes.

As the encounter conditions, the member can select a desired condition from the predetermined 16 conditions shown below, for example.

(1) any player
(2) player in same class as me
(3) player in a class higher than me
(4) player in a class lower than me
(5)–(16) select one team from the 12 baseball teams of the A League and B League.

The encounter conditions are not limited to the above example, but other conditions may be selected, for example, the speed of the communication line may be selected as an encounter condition from CATV (cable TV), ADSL (Asymmetric Digital Subscriber Line), ISDN (Integrated Services Digital Network), and modem (56 kbps or less), or the member may directly input a desired condition using the keyboard.

Then in Step S24, the CPU 22 judges whether the member has inputted the encounter conditions using the mouse; if the member has not inputted the encounter conditions, Step S24 is repeated, and if the member has inputted the encounter conditions, processing moves to Step S25.

Specifically, if the member selects a desired encounter condition from the above mentioned 16 encounter conditions, inputs it into the input box 181 shown in FIG. 13, and selects the "Register" button 182, the CPU 22 judges that the member has inputted the encounter conditions, and processing moves to Step S25.

When the member inputs the encounter conditions, the CPU 22 sends the inputted encounter conditions to the lobby server 13 using the communications section 26 in Step S25.

Then in Step S112, the lobby server 13 receives the transmitted encounter condition, reads from the game DB server 16 such information as the game records and the selected teams of other members who are accessing the game area where the member who set the encounter conditions is accessing, extracts the members who match the encounter conditions, and decides the opponent.

Then in Step S113, the lobby server 13 reads from the game DB server 16 the information on the game record of the member who set the encounter conditions, and sends the information on the game record of the member who set the encounter condition and of the member who was extracted as an opponent to the client computer 2.

Then in Step S26, the CPU 22 displays the encounter league combination screen on the display section 27 using such transmitted information as the game record of the opponent, so as to present this information on the opponent to the member.

Figure 14:
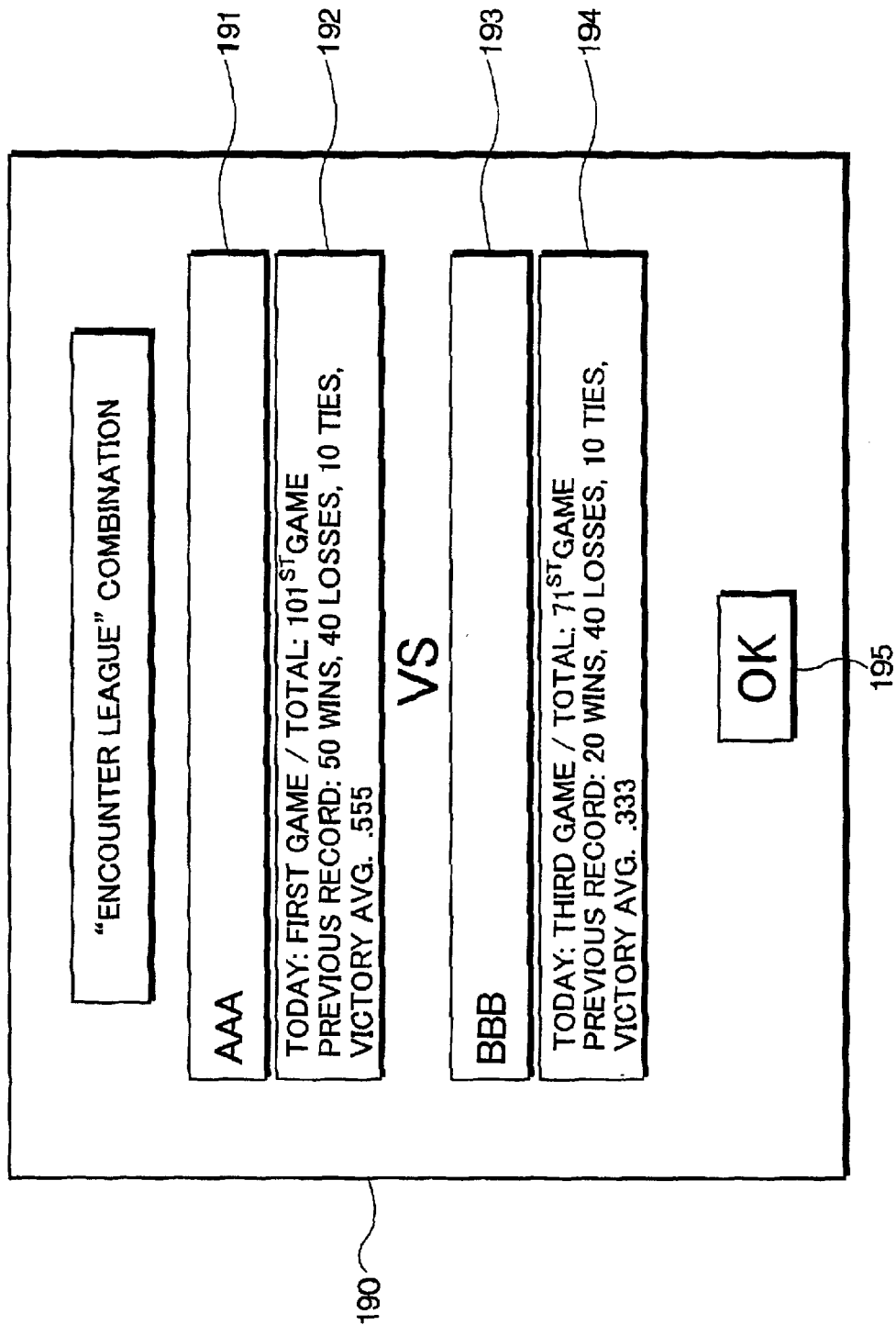
FIG. 14 is a diagram depicting an example of the encounter league combination screen.

FIG. 14 is a diagram depicting an example of the encounter league combination screen. In the encounter league combination screen 190 shown in FIG. 14, the nickname of the member ("AAA" in FIG. 14) is displayed in the display box 191 at the top section of the screen, and the number of games and the encounter league record of the member are displayed in the display box 192. The nickname of the opponent ("BBB" in FIG. 14) is displayed at the lower level of the screen in the display box 193, and the number of games and the encounter league record of the opponent are displayed in the display box 194.

In this way, the member can confirm the opponent, and when the member requests a game with this opponent in the encounter league and selects the "OK" button 195, processing moves to Step S27, and the encounter league match starts.

By the above processing, an opponent is decided from the other members who can play a game according to the encounter conditions which the member set using the client computer 2, so the member can select a desired opponent using the encounter conditions, and the member can exchange profiles only with the member with whom the member wants to build a friendship.

The member can relax the encounter conditions when an opponent cannot be found, so an opponent can be quickly found, and conversely the member can make the encounter conditions stricter when many potential opponents are extracted, so an opponent who is more suitable for the member can be selected, and thus the excitement of the baseball game as a net game can be further improved.

Then in Step S27, the CPU 22 sequentially executes the game progression processing until the game ends as a normal baseball game ends. The game progression processing here is, for example, bat/field first deciding processing, baseball field deciding processing, decided baseball field display processing, rule setting confirmation processing, game setting confirmation processing, individual team player order confirmation processing, game execution processing, and game result display processing. In FIG. 11, the display of processing of the server system 1, which is executed at this time, is omitted to simplify illustration, but the server system 1 appropriately executes the processing required for the client computer 2 to execute each above mentioned processing.

After the game in the encounter league ends in this way, the lobby server 13 instructs the game DB server 16 to add the member ID of the member to the friend list of the opponent, and to add the member ID of the opponent to the friend list of the member in step S114. The game DB server 16 creates the friend list of the member and the opponent by adding the member ID of the member to the friend list of the opponent, and by adding the member ID of the opponent to the friend list of the member.

Then in Step S115, the lobby server 13 allows the stored profile information of the member to be read at the client computer 2 of the member, and allows the stored profile information of the opponent to be read at the client computer 2 of the member. After the friend lists are created and the profile information exchanged in this way, the lobby server 13 notifies the client computer 2 that an update of the friend lists is complete.

Then in Step S28, after the notification of the friend list update completion is received via the communications section 26, the CPU 22 displays the profile exchange result description screen for notifying that the update of the friend lists is complete and profiles have been exchanged on the display section 27.

Figure 15:
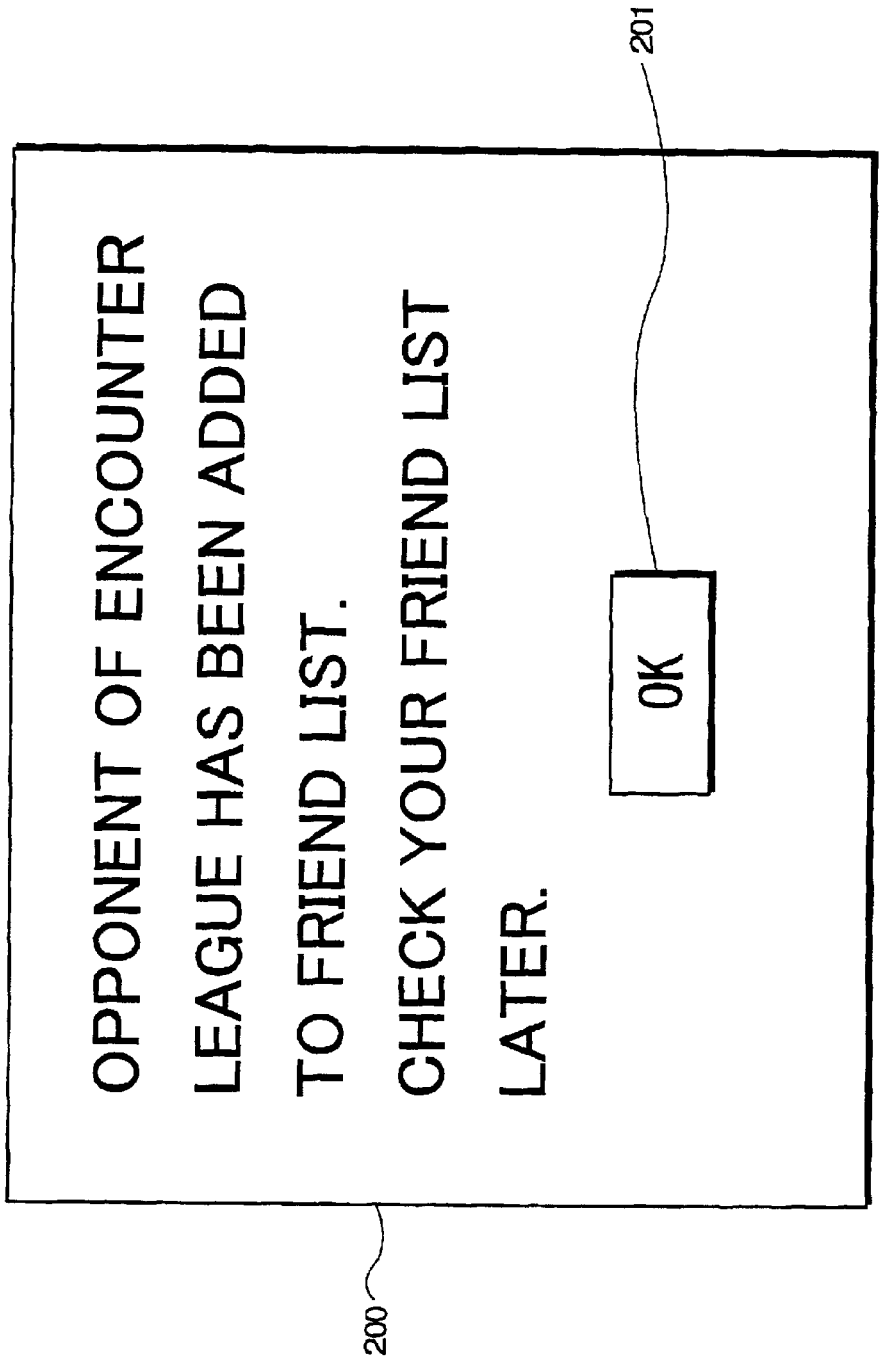
FIG. 15 is a diagram depicting an example of the profile exchange result description screen.

FIG. 15 is a diagram depicting an example of the profile exchange result description screen. For example, when the profile exchange result description screen 200, shown in FIG. 15, is displayed, the member can confirm that the profile exchange is complete, and the opponent-has been added to the friend list. Then the member can read the profile information of the opponent using the client computer 2, and the opponent can read the profile information of the member using the client computer 2.

When the member selects the "OK" button 201 using the mouse, the CPU 22 sends the game result of the encounter league played in Step S27 to the lobby server 13. The outcome of the encounter league is normally decided by the outcome of the baseball game, but if the line is disconnected, the lobby server 13 decides the outcome by regarding the member who first disconnected as the loser.

Then in Step S116, the lobby server 13 instructs the game DB server 16 to store the transmitted game result, and the game DB server 16 stores and manages the above mentioned game result of the encounter league.

In Step S29, on the other hand, the CPU 22 sequentially executes the game progression processing required after the game when the encounter league ends, and then ends processing. The game progression processing here is, for example, hero interview processing, game result display processing, and detailed game result display processing, including team data, fielders data, pitcher data, pitching data, and batting data.

After the above processing is complete and the game in the encounter league ends, the member can continue the above encounter league, or return to the game lobby select screen shown in FIG. 8, and select a game lobby.

In this way, according to the present embodiment, the profile information of the member transmitted from the client computer 2 is acquired, and at the end of the encounter league, the profile information of one member is allowed to be read at the client computer 2 of the other member, and the profile information of the other member is allowed to be read at the client computer 2 of the first member.

Since both can read the profile information of the opponent by exchanging profile information between opponents in this way, each player can know the profile information of the opponent, and friendship among members can be promoted through a baseball game played as a net game. Also, an opponent can be specified by the profile information, so games can be played consecutively with a specified opponent, which can provide the member with sufficient excitement. Also even if the member to be the opponent has not accessed when a member accesses the server system 1 to play a game, the member can request another member who has become an acquaintance via the exchange of profile information to play a game, so the enthusiasm of the member to participate in net games can be improved, and baseball games played as net games can be operated smoothly.

Now normal game progression processing will be described. When the game mode select screen 160 shown in is FIG. 10 is displayed, and the member selects the "Net Game" button 161 using the mouse, normal game progression processing starts.

Figure 16:
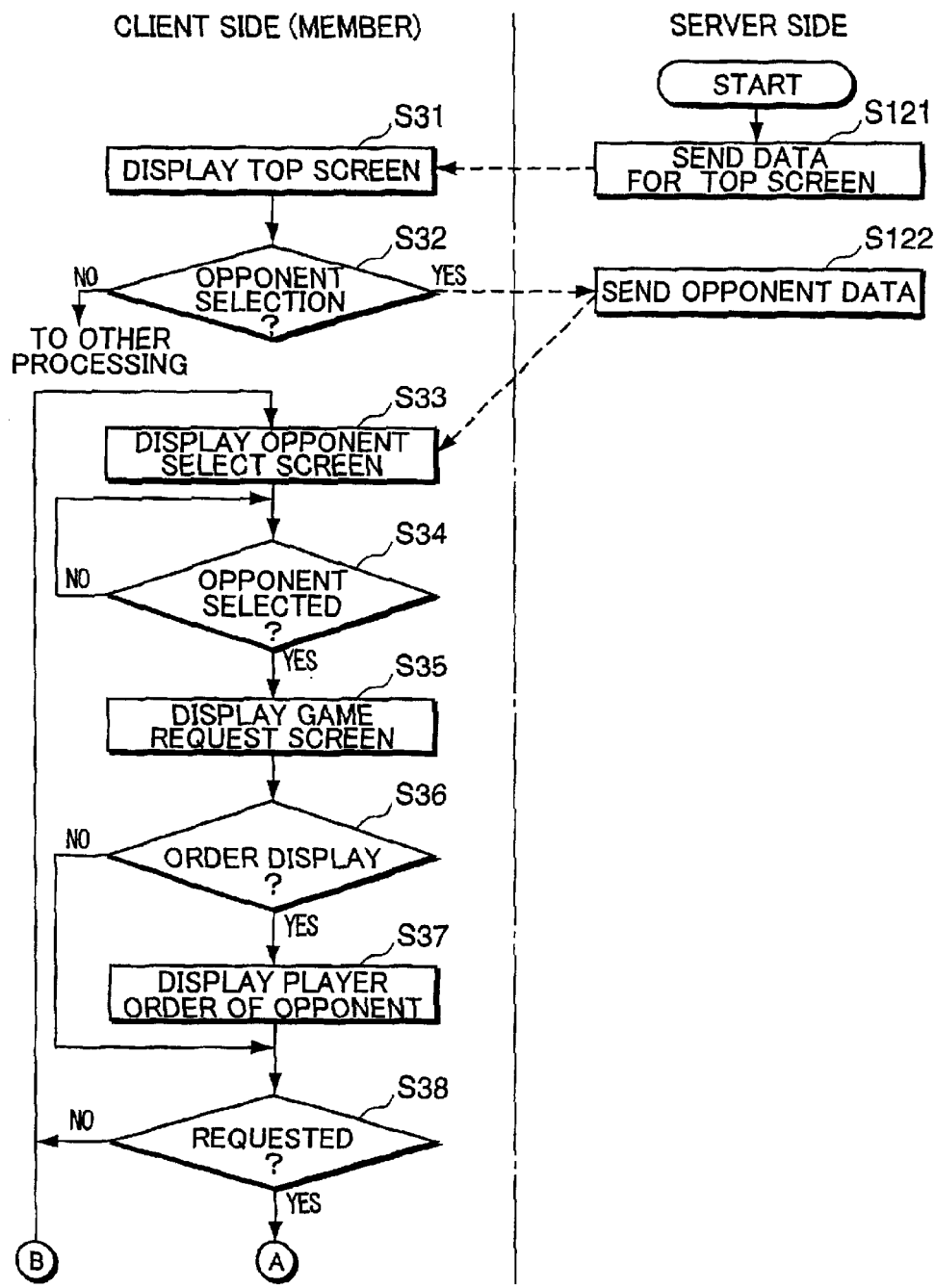
FIG. 16 is a first flow chart depicting an example of normal game progression processing by the server system and client computer shown in FIG. 1.
Figure 17:
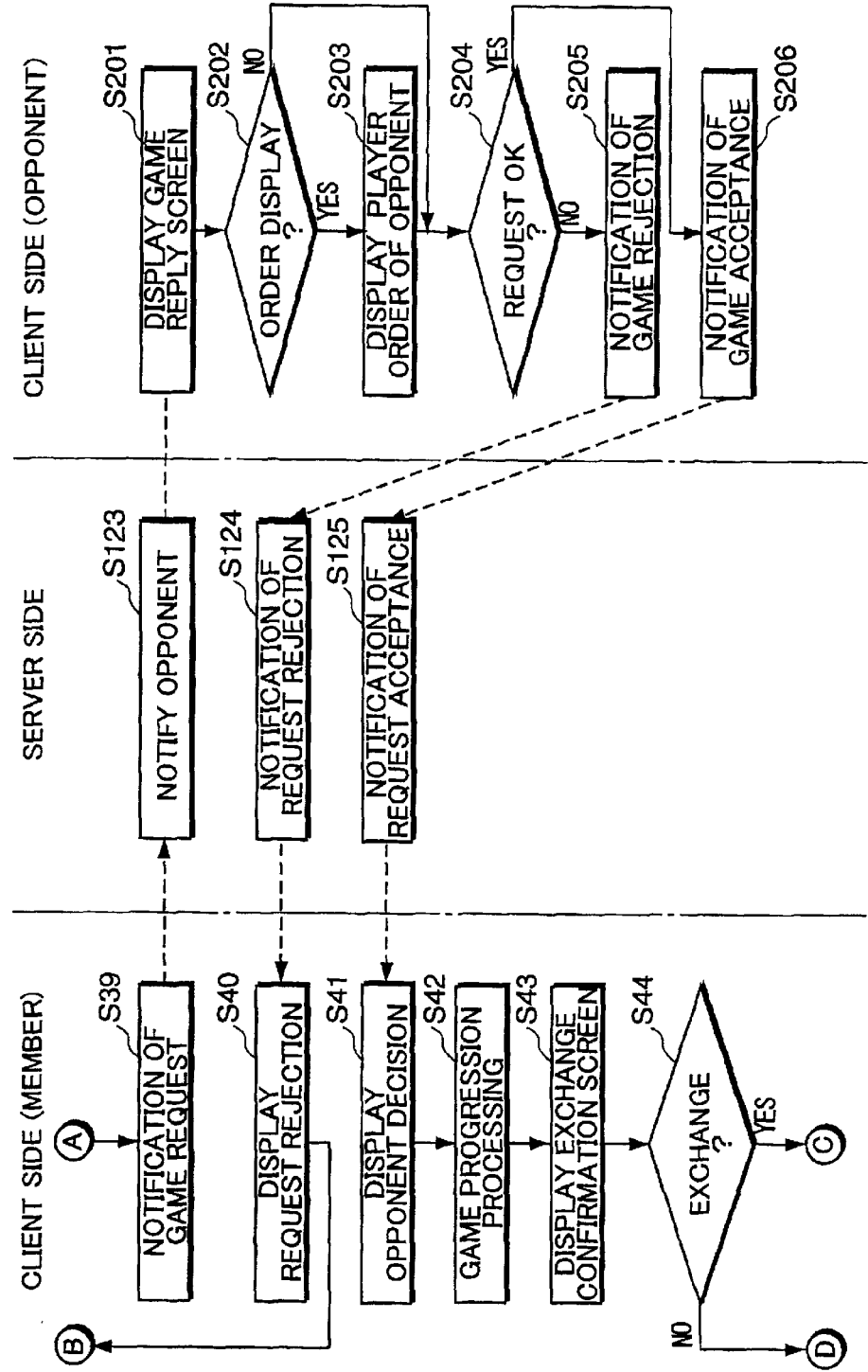
FIG. 17 is a second flow chart depicting an example of normal game progression processing by the server system and client computer shown in FIG. 1.
Figure 18:
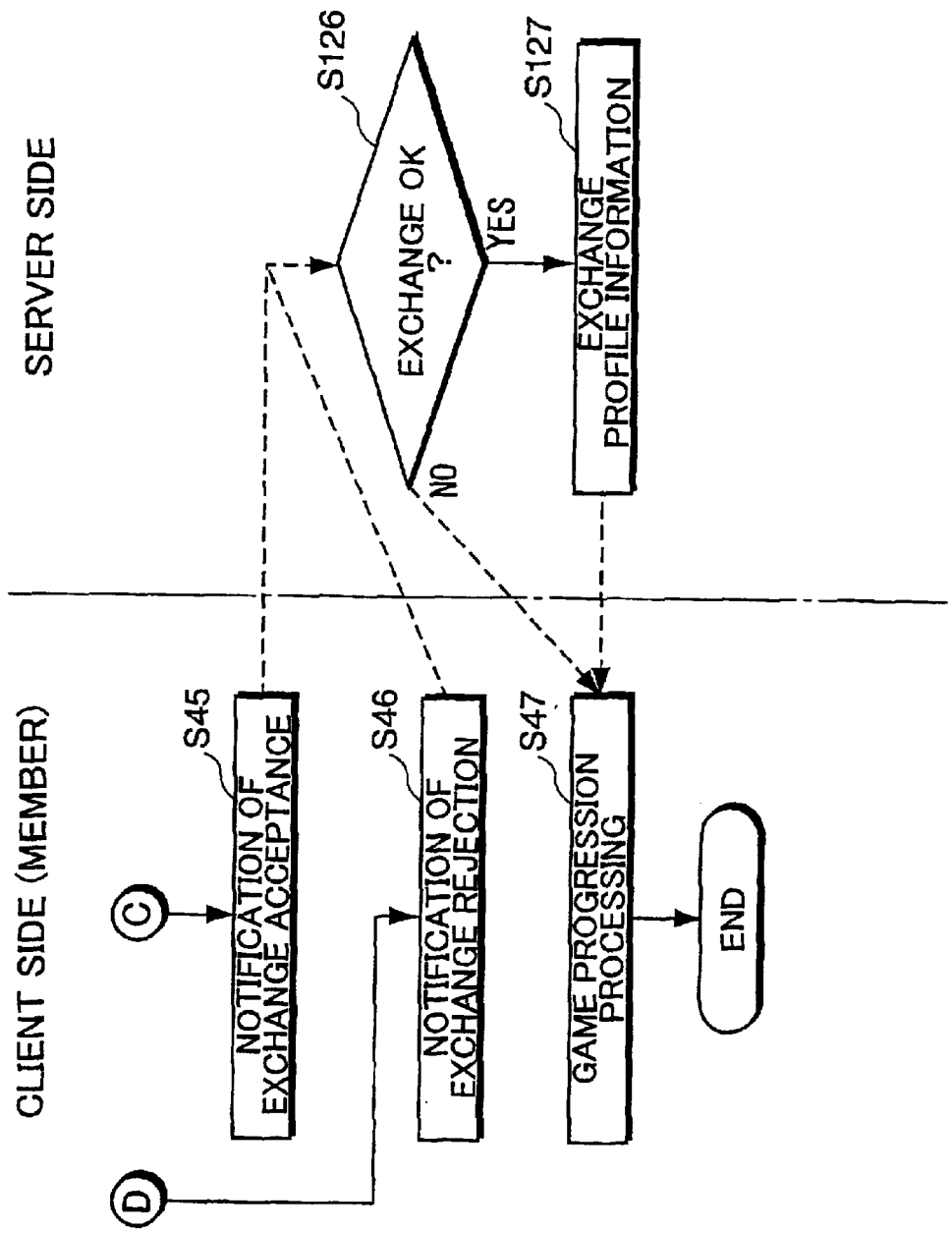
FIG. 18 is a third flow chart depicting an example of normal game progression processing by the server system and client computer shown in FIG. 1.

FIG. 16 to FIG. 18 are the first to third flow charts depicting an example of the normal game progression processing by the server system 1 and client computer 2 shown in FIG. 1. The normal game progression processing at the client computer 2 sides of the member and the opponent is implemented by the CPU 22 executing the game progression program, and the normal game progression processing at the server system 1 side is implemented by the lobby server 13 executing the normal game progression processing.

As FIG. 16 shows, in Step S121, the lobby server 13 sends the data for displaying the net game lobby top screen to the client computer 2 of the member.

Figure 19:
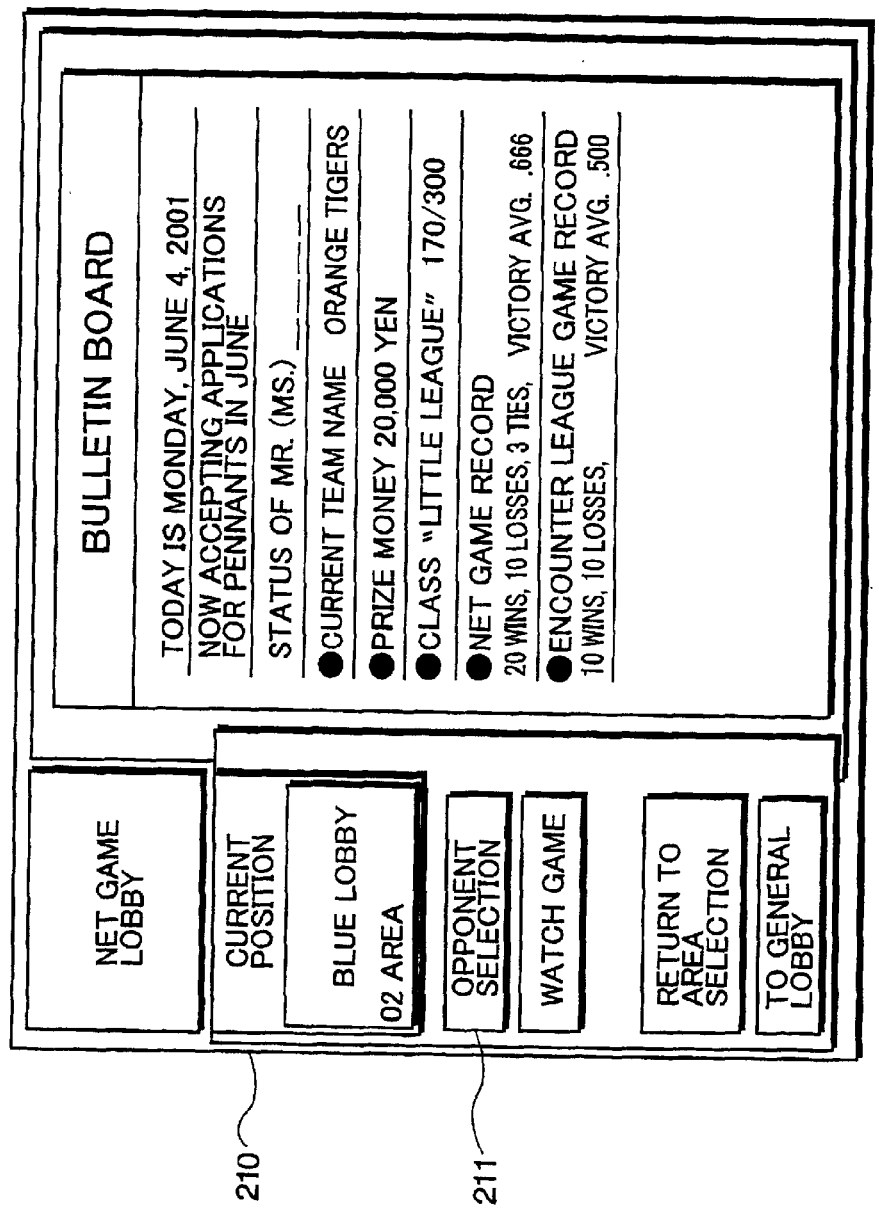
FIG. 19 is a diagram depicting an example of the net game lobby top screen.

Then in Step S31, the CPU 22 of the client computer 2 of the member displays the net game lobby top screen using the transmitted data. FIG. 19 is a diagram depicting an example of the net game lobby top screen. For example, the net game lobby top screen 210 shown in FIG. 19 is displayed.

Then in Step S32, the CPU 22 judges whether the member has selected an opponent using the "Opponent Select" button 211 shown in FIG. 19 using the mouse of the input section 25. If the member selects another command without selecting an opponent, the CPU 22 executes processing according to the selected command, and if the member has selected an opponent, the CPU 22 uses the communications section 26 to notify the lobby server 13 that the member has selected an opponent.

Then in Step S122, the lobby server 13 sends the data on members who can currently play a game, that is, candidates to be opponents, to the client computer 2. The data on the candidates to be opponents includes the nicknames of the opponents and the player order of the teams.

Figure 20:
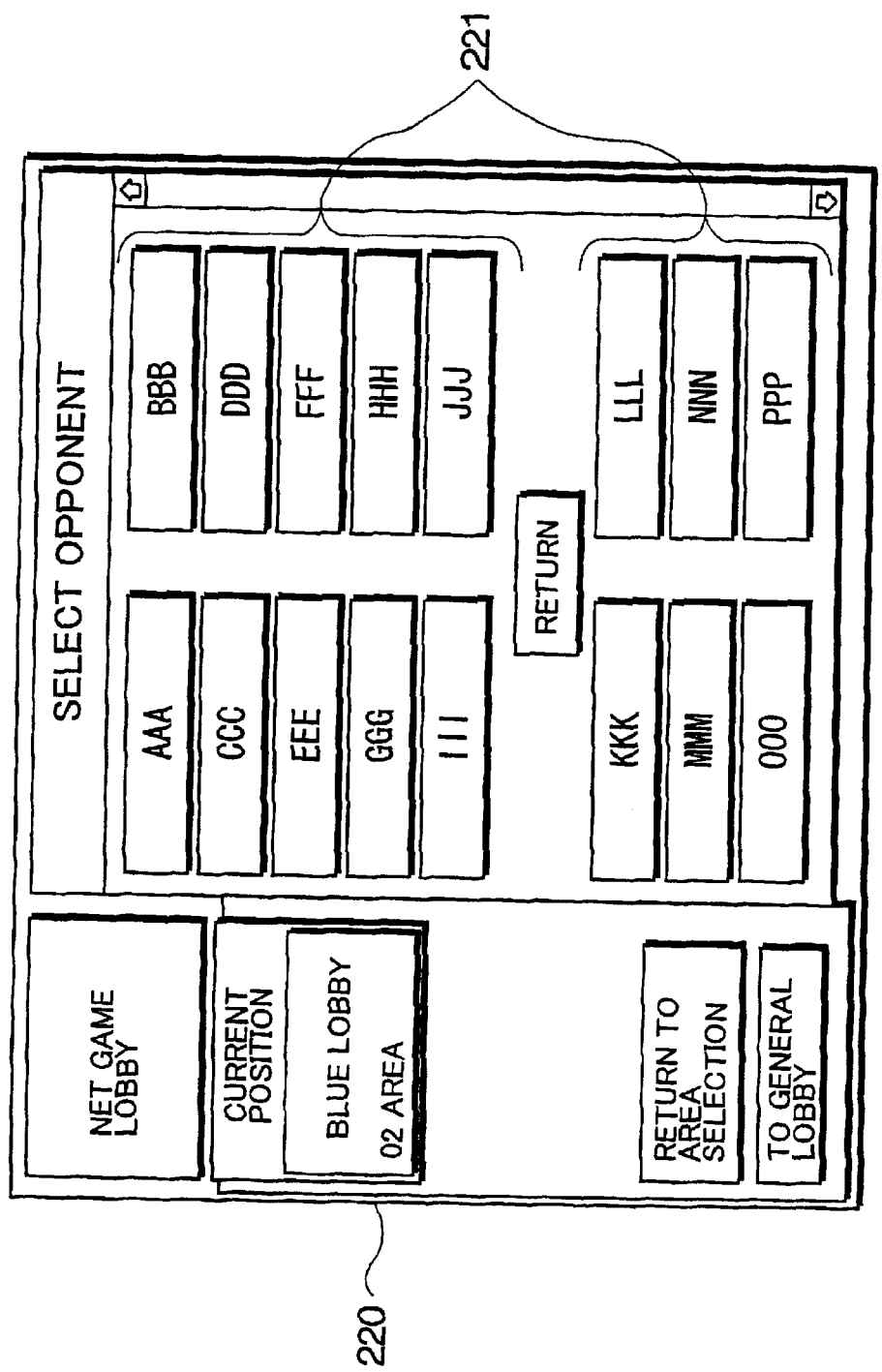
FIG. 20 is a diagram depicting an example of the opponent select screen.

In Step S33, the CPU 22 uses the transmitted data to display the opponent select screen on the display section 27 for the member to select an opponent. FIG. 20 is a diagram depicting an example of the opponent select screen. For example, the opponent select screen 220 shown in FIG. 20 is displayed, and a plurality of opponent buttons 221 are displayed, where the nicknames ("AAA"-"PPP" in FIG. 20) of members are displayed. The nickname of each member is registered by each member during member registration, each nickname corresponds to the member ID, and each member can be specified using a nickname.

Then in Step S34, the CPU 22 judges whether the member has selected an opponent by selecting one opponent button from the plurality of opponent buttons 221 using the mouse; when an opponent is not selected, Step S34 is repeated, and if an opponent is selected, processing moves to Step S35.

Figure 21:
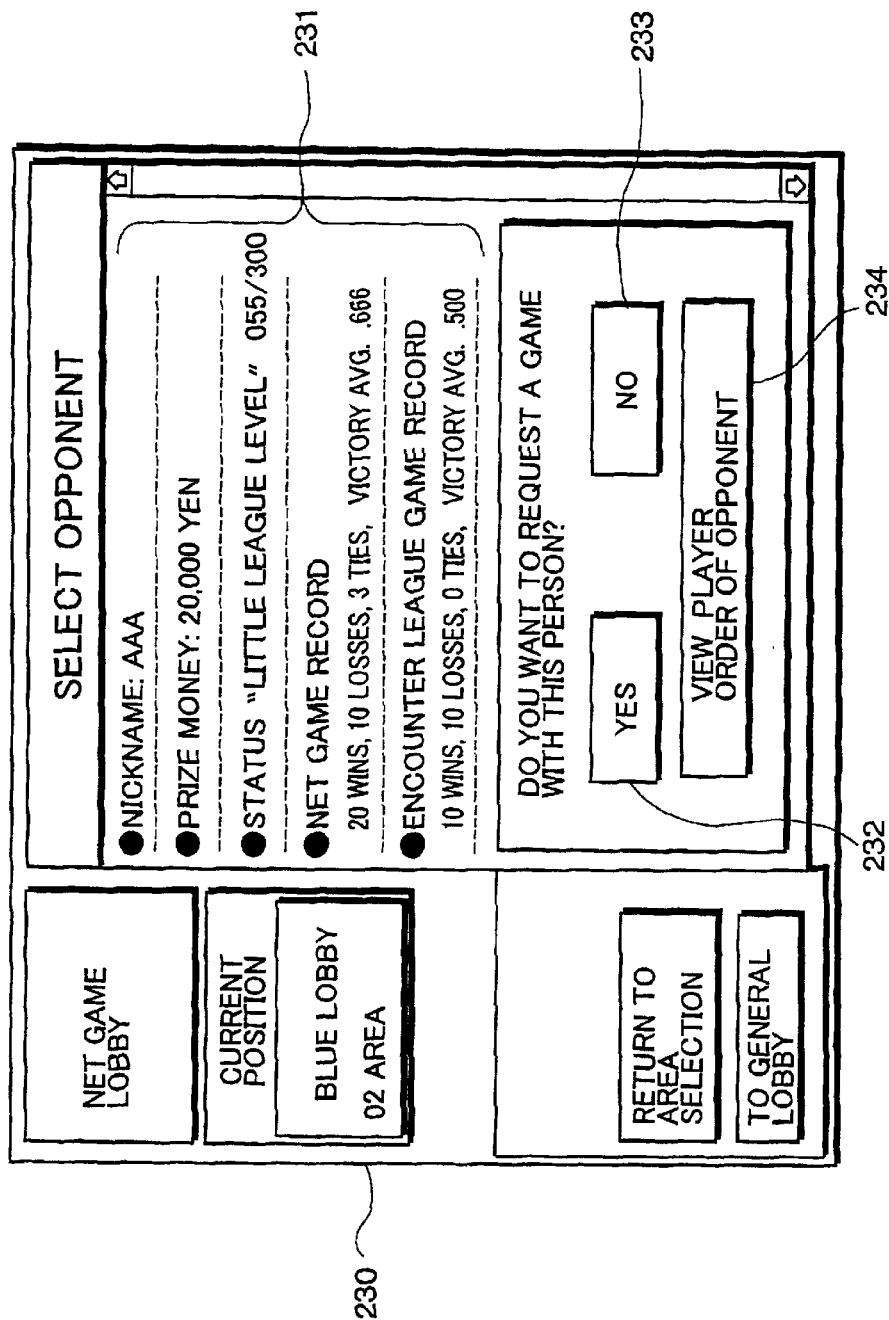
FIG. 21 is a diagram depicting an example of the game request screen.

Then in Step S35, the CPU 22 displays the game request screen for the member to request an opponent to play a game on the display section 27. FIG. 21 is a diagram depicting an example of the game request screen. The game request screen 230 shown in FIG. 21 is displayed, and information on the opponent 231, such as the status indicating the ability of an opponent (little league level in the example in FIG. 21) is displayed. Also the "View Order of Opponents" button 234, to view the team player order which the opponent will use, is displayed to learn more details about the opponent, and the "YES" button 232 for requesting a game and the "NO" button 234 for searching for another opponent without requesting a game are displayed.

Then in Step S36, the CPU 22 judges whether the member has selected the "View Order of Opponent" button 234 using the mouse; when the "View Order of Opponent" button 234 is not selected, processing moves to Step S38, and when the "View Order of Opponent" button 234 is selected, processing moves to Step S37.

When the "View Order of Opponent" button 234 is selected, in step S37, the CPU 22 displays the order presentation screen, where the player order of the team to be used by the opponent, such as the starting order, players on the bench, and players not playing, are displayed on the display section 27, just like the order setup screen shown in FIG. 7.

By the above mentioned processing, the member can confirm the team player order to be used by the opponent, so player configuration, such as the starting order, players on the bench, and players not playing, of the team of the opponent can be known in detail by viewing the player order of the team of the opponent. Therefore the member can compare the player order of his/her own team, and the player order of the team of the opponent, and whether the game will be played against his opponent can be carefully judged, so the baseball game can be played using careful strategy based on the player order of the teams, and the excitement of the baseball game can be improved.

Also in the present embodiment, the number of innings of a normal game is set to 9, and the game time thereof is set to a maximum of 90 minutes, however the number of innings of the encounter league is 3, and the game time thereof is limited to a maximum of 30 minutes. Therefore the game time of the encounter league is shorter than the game time of the normal game, so the members can play more encounter leagues than normal games within a predetermined time. As a result, a member can have many opportunities to exchange profile information with other members, so friendship among members can be easily expanded.

When the member does not select the "View Order of Opponent" button 234 or after the processing in Step S37 ends, the CPU 22 judges whether the member has selected the "YES" button 232 to request to play a game in Step S38; if the member selects the "NO" button 233 to reject the request to play a game, processing moves to Step S33 to repeat subsequent processing, and if the member selects the "YES" button 232, processing moves to Step S39, as shown in FIG. 17.

Then in Step S39 shown in FIG. 17, the CPU 22 uses the communications section 26 to notify the lobby server 13 that the member has requested the selected opponent to play a game.

Then in Step S123, the lobby server 13 informs the client computer 2 of the opponent that the member has requested to play a game.

Then in Step S201, the CPU 22 of the client computer 2 of the opponent receives the notification that the member has requested to play a game, and displays the game reply screen for the opponent to reply to the request to play a game on the display section 27.

Figure 22:
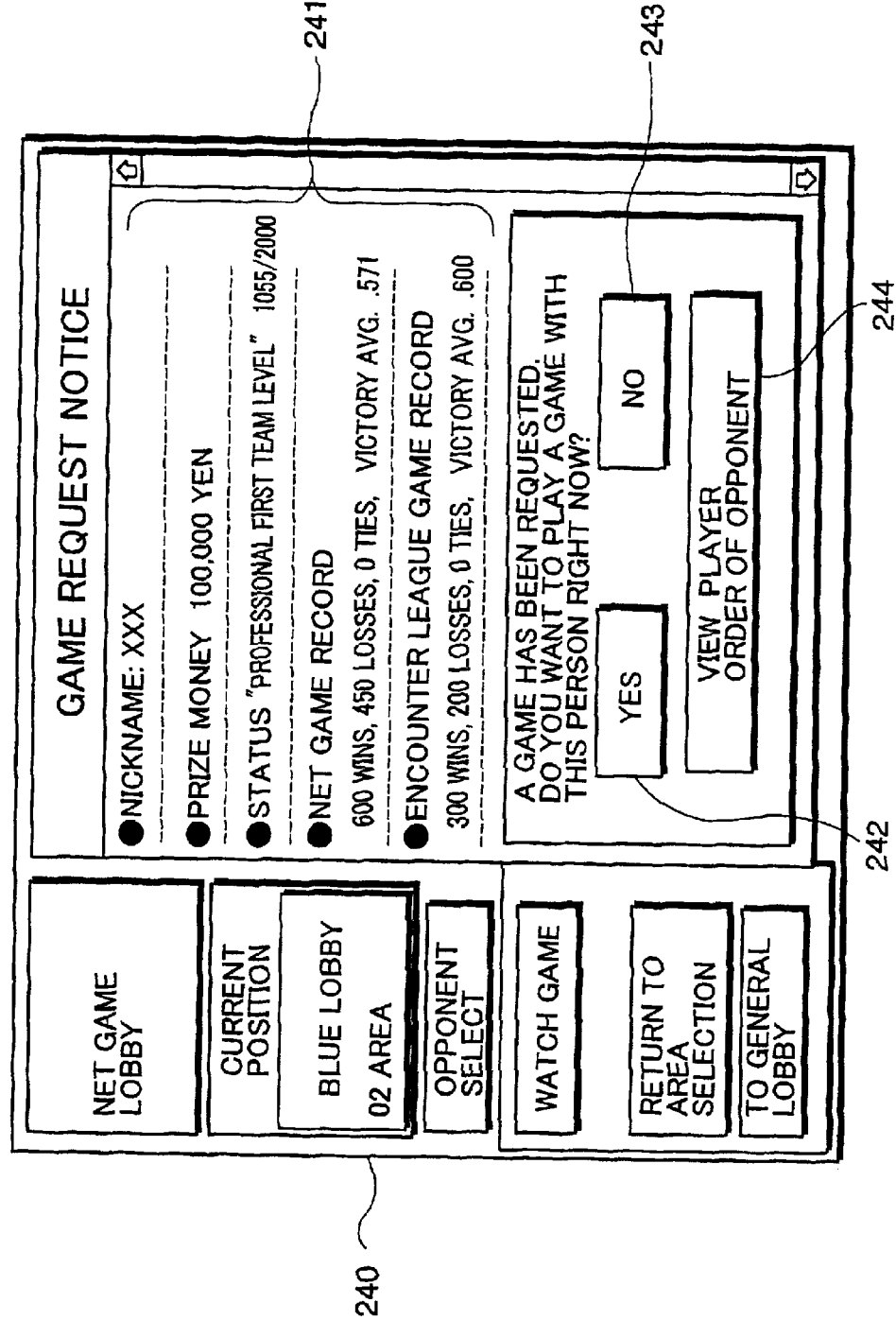
FIG. 22 is a diagram depicting an example of the game reply screen.

FIG. 22 is a diagram depicting an example of the game reply screen. For example, the game reply screen 240 shown in FIG. 22 is displayed, and the nickname of the member who has requested to play a game, and information 241 on the member, such as the status to indicate player ability (the first team level in the case of the example in FIG. 22) are displayed. Also the "View Order of Opponent" button 244 to view the player order of the team to be used by the member is displayed to learn in more detail about the member, and the "YES" button 242 to accept the request to play a game and the "NO" button 243 to reject the request to play a game are displayed.

Then, in Step S202, the CPU 22 of the client computer 2 of the opponent judges whether the opponent has selected the "View Order of Opponent" button 244 using the mouse of the input section 25; if the "View Order of Opponent" button 244 is not selected, processing moves to Step S204, and if the "View Order of Opponent" button 244 is selected, processing moves to Step S203.

When the "View Order of Opponent" button 244 is selected, the CPU 22 of the client computer 2 of the opponent displays the order presentation screen, where the player order of the team to be used by the member, such as the starting order, players on the bench, and players not playing, are displayed on the display section 27 in Step S203, similarly to the order setup screen shown in FIG. 7.

By the above processing, the opponent can confirm the player order of the team to be used by the member, so the opponent can learn the player configuration, such as the starting order, players on the bench, and players not playing, of the team of the member in detail by viewing the player order of the team of the member. Therefore the opponent can carefully judge whether to play a game with the member by comparing and considering the player order of his/her own team and the order of the team of the member, so the baseball game can be played using a careful strategy based on the order of the team, and the excitement of the baseball game can be further improved.

When the opponent does not select the "View Order of Opponent" button 244 or after the processing in Step S203 ends, the CPU 22 of the client computer 2 of the opponent judges whether the opponent has selected the "YES" button 242 to accept the request to play a game in Step S204; if the opponent selects the "NO" button 243 to reject the request to play a game, processing moves to Step S205, and if the opponent selects the "YES" button 242, processing moves to Step S206.

When the opponent selects the "NO" button 243 to reject the request to play a game, the CPU 22 of the client computer 2 of the opponent informs the lobby server 13 that the opponent has rejected the request to play a game using the communications section 26 in Step S205.

Then in Step S124, the lobby server 13 informs the client computer 2 of the member whose request to play a game has been rejected by the opponent.

Then in Step S40, the CPU 22 of the client computer 2 of the member receives the notification that the opponent has rejected the request to play a game using the communications section 26, and displays the fact that the opponent has rejected the request to play a game on the display section 27, then, after the member confirms that the request to play a game is rejected, processing moves to Step S33 to continue subsequent processing.

When the "YES" button 242 to accept the request to play a game is selected, the CPU 22 of the client computer 2 of the opponent notifies the lobby server 13 that the opponent has accepted the request to play a game using the communications section 26 in Step S206.

Then in Step S125, the lobby server 13 notifies the client computer 2 of the member that the opponent has accepted the request to play a game.

Then in Step S41, the CPU 22 of the client computer 2 of the member receives the notification that the opponent has accepted the request to play a game using the communications section 26, displays the fact that the opponent has been determined on the display section 27.

Then in Step S42, the CPU 22 sequentially executes game progression processing in the same way as Step S27 shown in FIG. 11, until the game play of the normal game ends.

Figure 23:
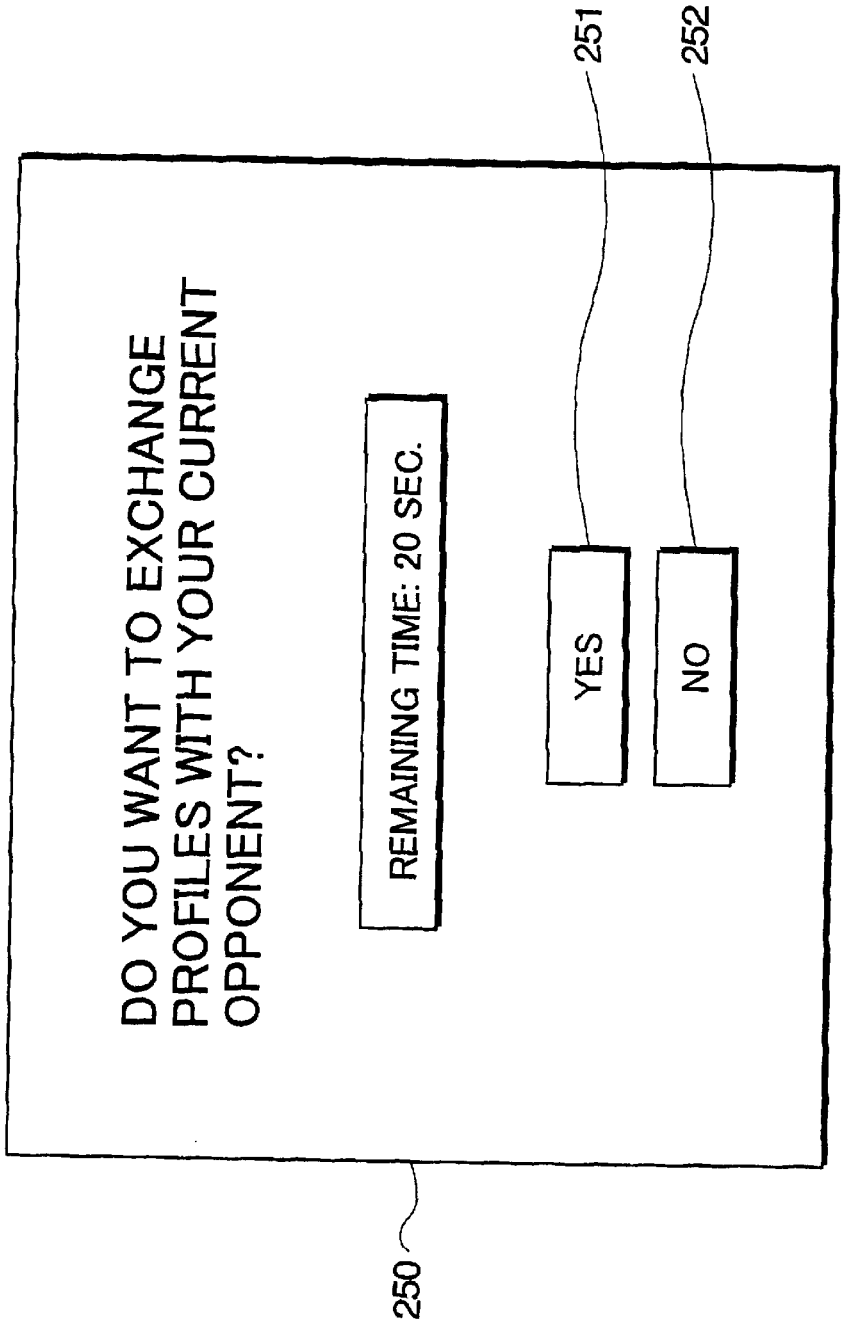
FIG. 23 is a diagram depicting an example of the profile exchange confirmation screen.

After the game play of the normal game ends, in step S43, the CPU 22 displays the profile exchange confirmation screen for confirming whether profile information is to be exchanged with the opponent on the display section 27. FIG. 23 is a diagram depicting an example of the profile exchange confirmation screen. For example, the profile exchange confirmation screen 250 shown in FIG. 23 is displayed, where the "YES" button 251 for exchanging profile information with the opponent and the "NO" button 252 for not exchanging profile information with the opponent are displayed.

Then in Step S44, the CPU 22 judges whether the member has selected the "YES" button 251 for exchanging the profile information with the opponent using the mouse; if the member selects the "YES" button 251, processing moves to Step S45 shown in FIG. 18, and if the member selects the "NO" button 252, processing moves to Step S46 shown in FIG. 18.

When the member selects the "YES" button 311 shown in FIG. 23 for exchanging profile information with the opponent, the CPU 22 notifies the lobby server 13 that the member has selected to exchange profile information with the opponent using the communications section 26 in Step S45 in FIG. 18. At this time, the CPU 22 transmits the game result of the baseball game played in Step S42 to the lobby server 13 using the communications section 26.

When the member selects the "NO" button 252 shown in FIG. 23 for rejecting to exchange profile information with the opponent, on the other hand, the CPU 22 notifies the lobby server 13 that the member has rejected to exchange profile information with the opponent using the communications section 26 in Step S46. At this time, the CPU 22 sends the game result of the baseball game played in Step S42 to the lobby server 13 using the communications section 26.

In FIG. 17 and FIG. 18, the processing of the client computer 2 of the opponent, which is performed corresponding to the processing in Steps S43 to S46, is omitted to simplify the drawings, but each processing is sequentially executed in the client computer 2 of the opponent as well, just like Steps 43 to S46, and the judgment result on the profile information exchange of the opponent is also notified to the lobby server 13.

The processing of the client computer 2 of the opponent, which is performed corresponding to the processing in Step S42 and the following Step S47, and the processing of the server system 1, which is executed for this processing, are also omitted, but each processing is sequentially executed in the client computer 2 of the opponent as well, just like Steps S42 and S47, and the server system 1 appropriately executes the processing required for the client computers 2 of the member and the opponent to execute each above mentioned processing.

After the processing in Steps S45 and S46 ends, the lobby server 13 instructs the game DB server 16 to store the transmitted game result in Step S126, and the game DB server 16 stores the game result of the above mentioned normal game. Also in Step S126, the lobby server 13 judges whether the member has selected to exchange profile information with the opponent, and whether the opponent has selected to exchange profile information with the member, and if both the member and the opponent has selected to exchange profile information, processing moves to Step S127, whereas if either the member or the opponent has rejected to exchange profile information, processing moves to Step S47.

When both the member and the opponent select to exchange profile information, the lobby server 13 instructs the game DB server 16 to add the member ID of the member to the friend list of the opponent, and to add the member ID of the opponent to the friend list of the member in Step S127. The game DB server 16 updates the friend lists by adding the member ID of the member to the friend list of the opponent, and by adding the member ID of the opponent to the friend list of the member.

Also in Step S127, the lobby server 13 allows the stored profile information of the member to be read at the client computer 2 of the opponent, and allows the stored profile information of the opponent to be read at the client computer 2 of the member. In this case, the member can read the profile information of the opponent using the client computer 2, and the opponent can also read the profile information of the member using the client computer 2.

Finally in Step S47, the CPU 22 sequentially executes the game progression processing after the game is over, just like Step S29 shown in FIG. 11. When the above processing ends and the game play of a normal game ends, the member can continue the above mentioned normal game or can return to the game lobby select screen shown in FIG. 7 to select a game lobby.

In this way, the friend lists are created in the normal game, and when the profile information is exchanged, the same effect as the profile information exchange in the friend league can be obtained.

Now the friend list management processing for managing the friend list created as above will be described. When the game mode select screen shown in FIG. 9 is displayed, friend list management processing starts when the member selects the "Friend List" button 152 using the mouse.

Figure 24:
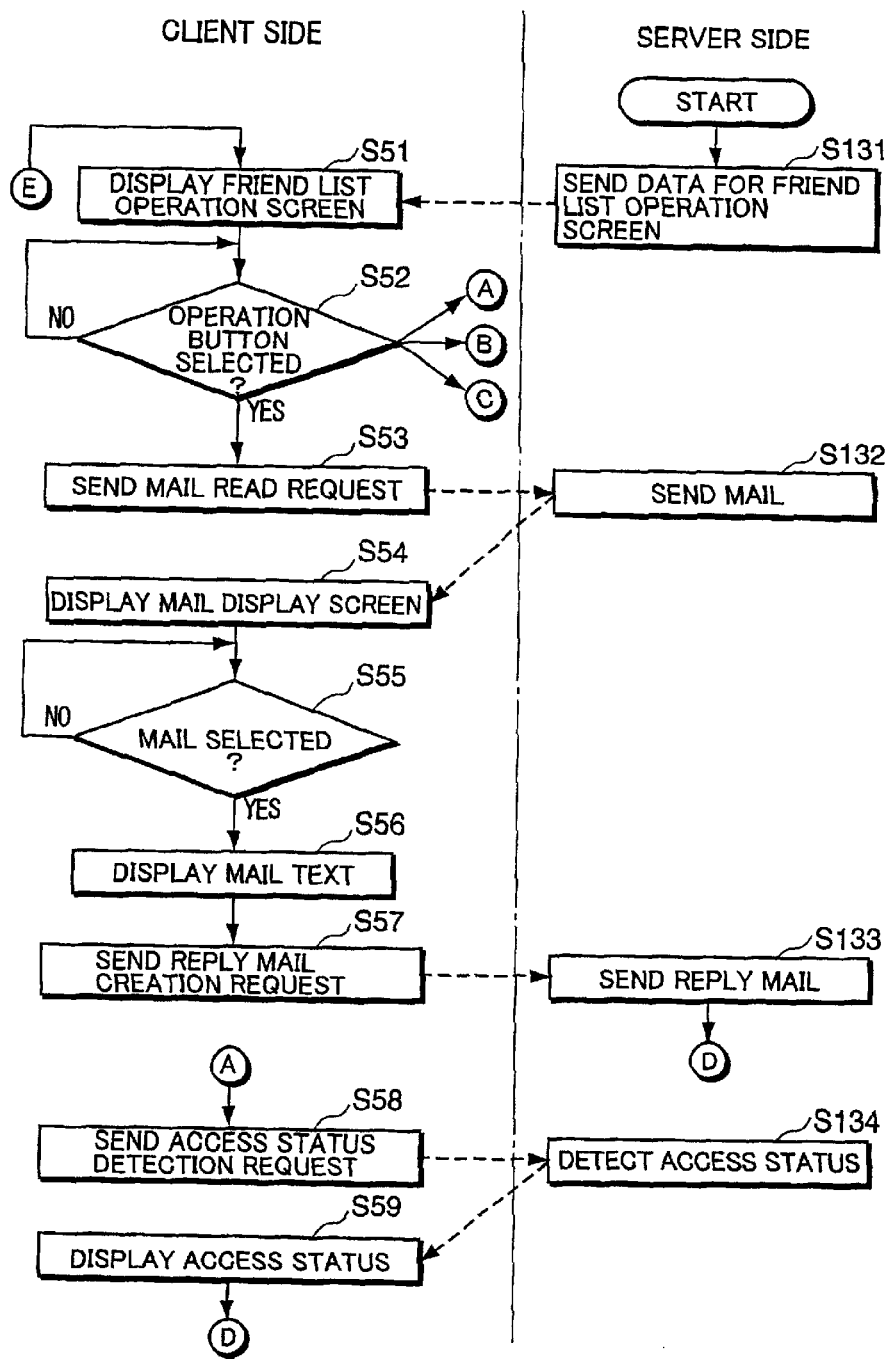
FIG. 24 is a first flow chart depicting an example of friend list management processing by the server system and client computer shown in FIG. 1.
Figure 25:
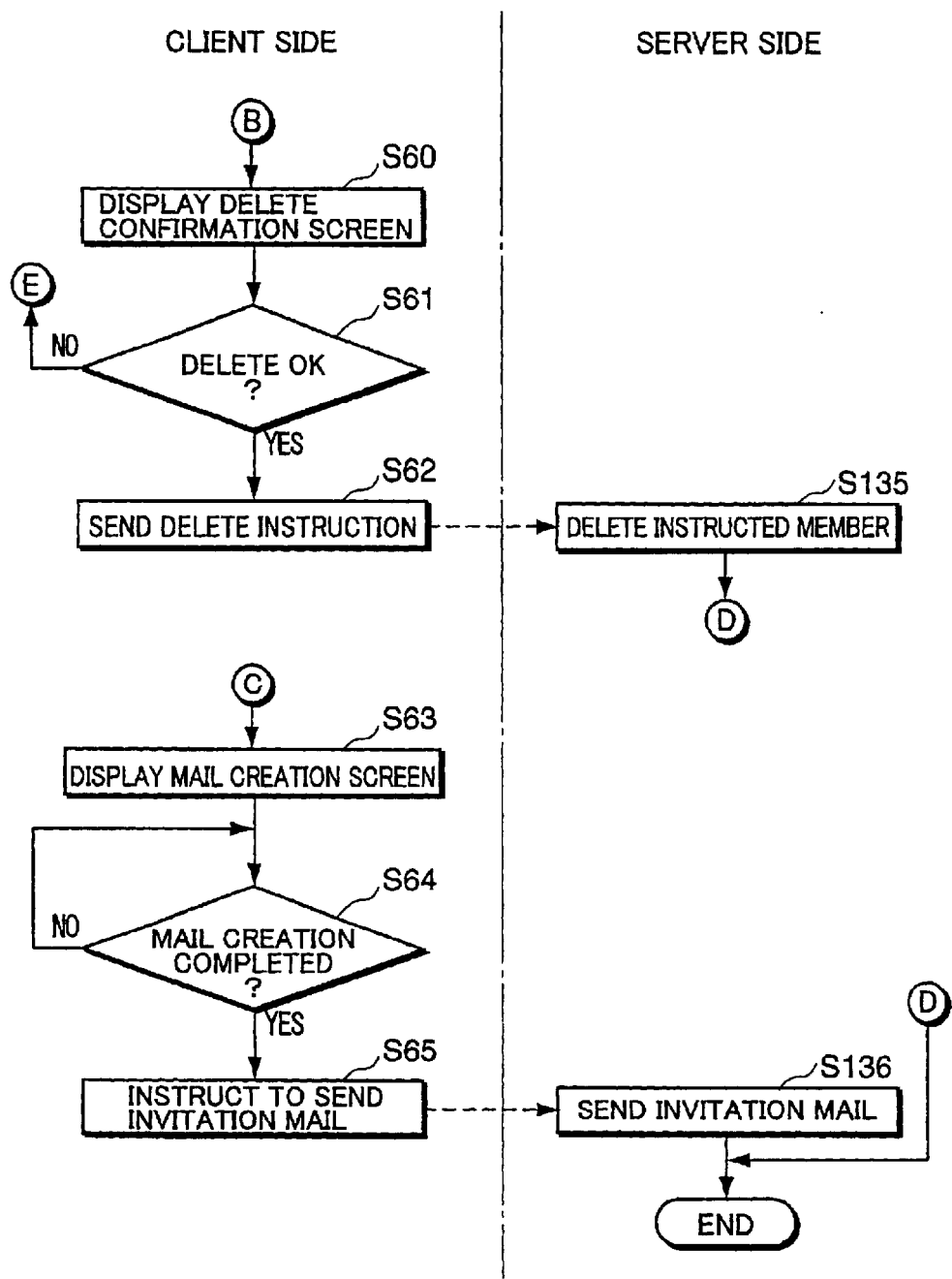
FIG. 25 is a second flow chart depicting an example of friend list management processing by the server system and client computer shown in FIG. 1.

FIG. 24 and FIG. 25 are the first and second flow charts depicting an example of the friend list management processing by the server system 1 and the client computer 2 shown in FIG. 1. The friend list management processing at the client computer 2 side shown in FIG. 24 and FIG. 25 is implemented by the CPU 22 executing the game progression program, and the friend list management processing at the server system 1 side is implemented by the lobby server 13 executing the friend list management program.

As FIG. 24 shows, in Step S131, the lobby server 13 reads the member ID registered in the friend list of the member from the game DB server 16, and sends to the client computer 2 the data for displaying the friend list operation screen for the member to perform various operations on the friend list.

Figure 26:
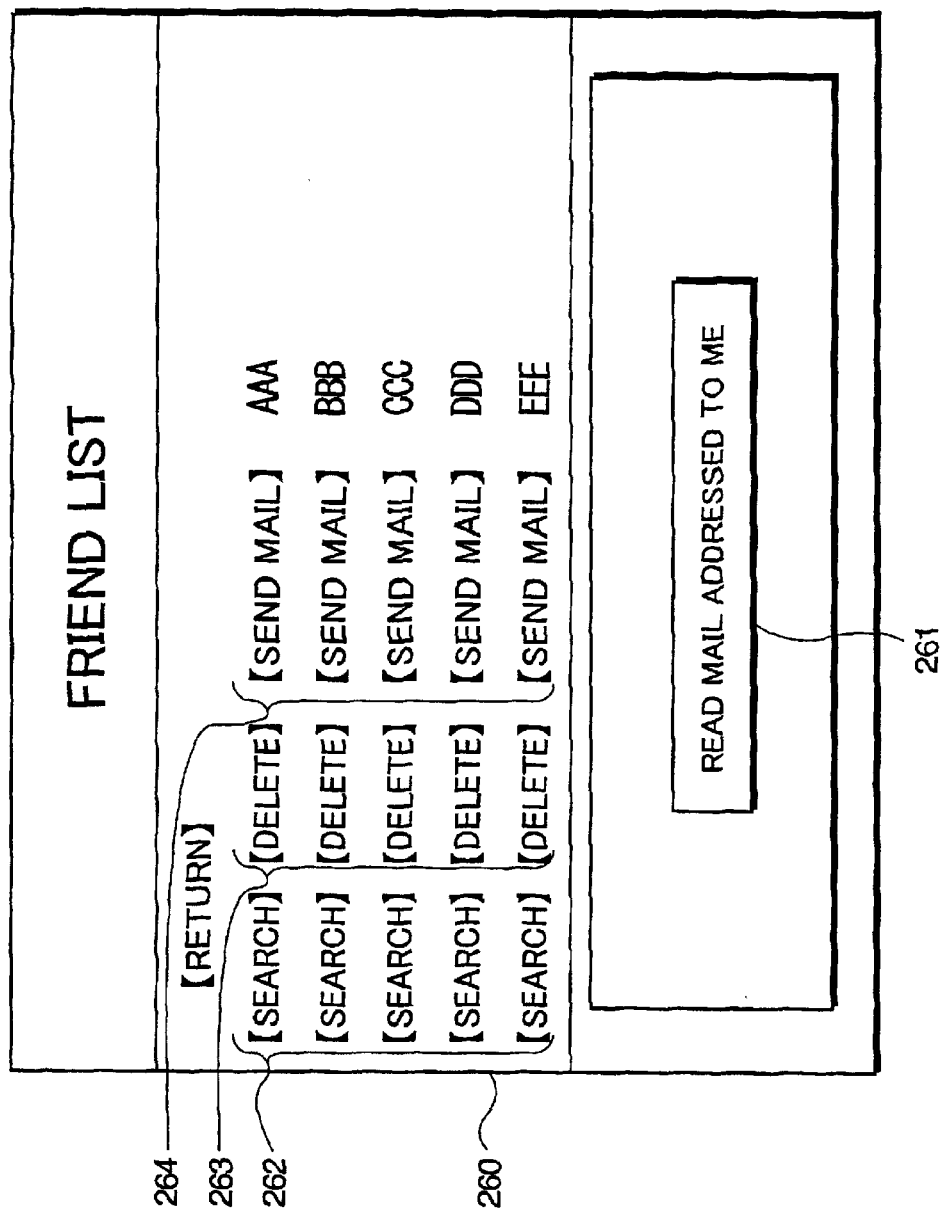
FIG. 26 is a diagram depicting an example of the friend list operation screen.

Then in Step S51, the CPU 22 displays the friend list operation screen on the display section 27 using the transmitted data. FIG. 26 is a diagram depicting an example of the friend list operation screen. For example, the friend list operation screen 260 shown in FIG. 26 is displayed, and the "Read Mail Addressed to Me" button 261 for the member to read mail addressed to him/herself, the "Search" button 262 for the member to learn the access status of the other members included in the friend list, the "Delete" button 263 for the member to delete another member included in the friend list from the friend list, and the "Send Mail" button 264 for the member to send an invitation mail to another member included in the friend list, are displayed along with the nicknames (e.g. "AAA", etc. in the drawing) of the members for each member included in the friend list.

Then in Step S52, the CPU 22 judges whether the member has made a selection from the above operation buttons using the mouse of the input section 25, and if the member has selected an operation button, processing moves to one of Step S53, S58, S60 and S63 according to the selected operation button. Specifically, processing moves to Step S53 if the "Read Mail Addressed to Me" button 261 shown in FIG. 26 is selected, moves to Step S58 if the "Search" button 262 is selected, moves to Step S60 shown in FIG. 25 if the "Delete" button 263 is selected, and moves to Step S63 shown in FIG. 25 if the "Send Mail" button 264 is selected.

When the "Read Mail Addressed to Me" button 261 is selected, the CPU 22 sends a mail read request to the lobby server 13 using the transmission section 26 in Step S53.

Then in Step S132, the lobby server 13 reads the invitation mail stored in the mail box of the member who sent the mail read request from the mail server 12, and sends the read invitation mail to the client computer 2.

Then in Step S54, the CPU 22 receives the invitation mail using the transmission section 26, and displays the mail display screen for displaying the received invitation en mail on the display section 27.

Figure 27:
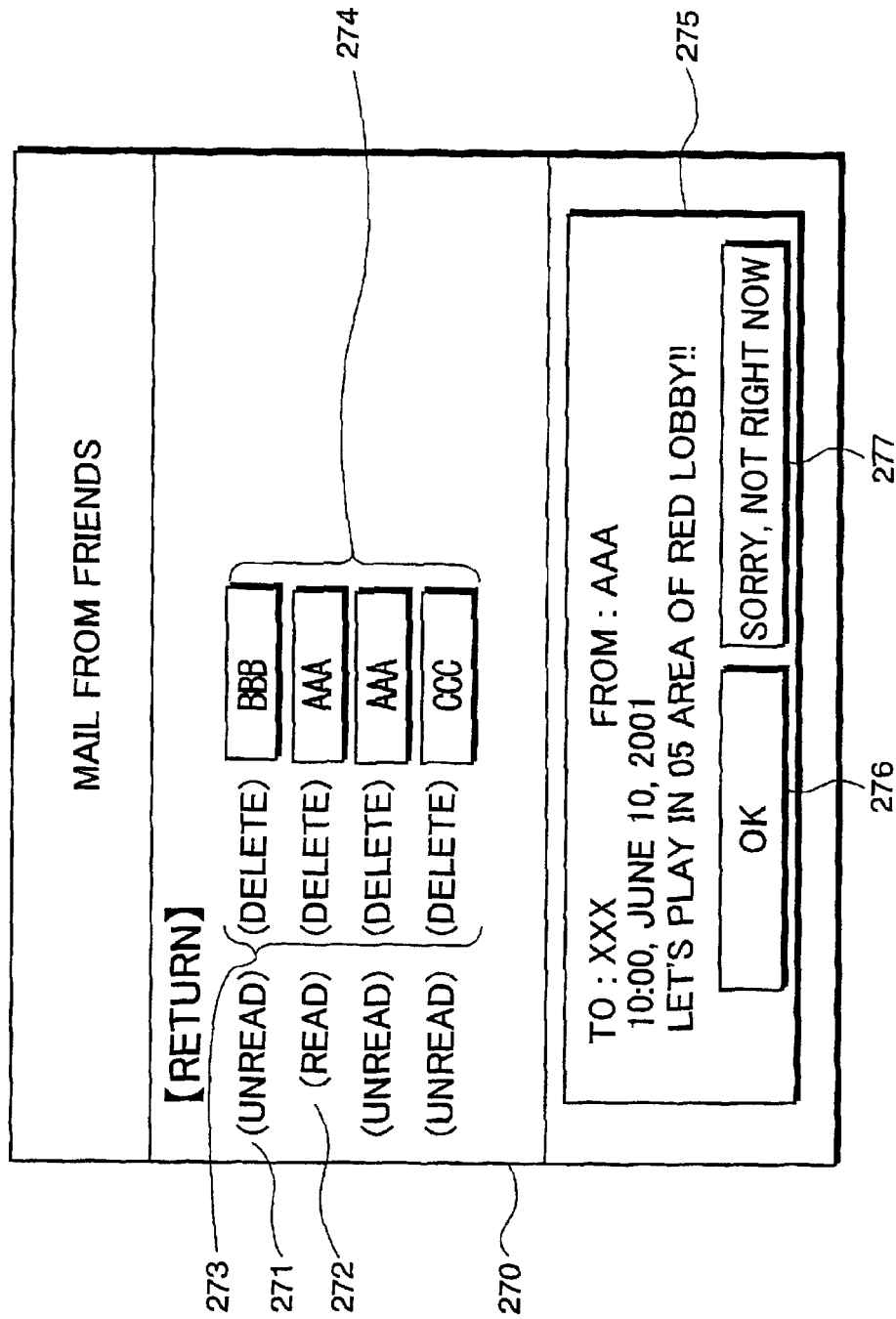
FIG. 27 is a diagram depicting an example of the mail display screen.

FIG. 27 is a diagram depicting an example of the mail display screen. For example, the mail display screen 270 shown in FIG. 27 is displayed, and each invitation mail is displayed so as to be specifiable by mail select buttons 274 displaying the nicknames (e.g. "AAA" in the drawing) of the transmitters in the upper section of the screen. In each invitation mail, an unread indication 271, which indicates that the mail has not been read, or a read indication 272, which indicates that the mail has already been read, is displayed, and the member can read a desired invitation mail by selecting a desired mail select button 274.

There is a limit to the number of invitation mails which each member can receive in a mail box, and in the present embodiment, for example, invitation mail is managed by the mail server 12, where old mail is sequentially deleted if the number of invitation mail exceeds 100, so the maximum number of mail is 100. The member can also freely delete invitation mail using the "Delete" button 273.

Then in Step S55, the CPU 22 judges whether the member has selected the mail select button 274 using the mouse; if the member has selected the mail select button 274, processing moves to Step S56, and if the member has not select the mail select button 274, the CPU 22 repeats Step S55.

When the mail select button 274 is selected, the CPU 22 displays the text of the invitation mail corresponding to the selected mail select button 274 on the mail display section 275 in Step S56. In the case of the example shown in FIG. 27, the second invitation mail from the top is selected, and the text of the invitation mail from the member with the nickname AAA to the member with the nickname XXX is displayed with the reception time. In this case, this member can know that the member with the nickname AAA is in the 05 area of the RED lobby to play a game.

Then in Step S57, if the member selects the "OK" button 276 shown in FIG. 27 using the mouse, the CPU 22 instructs the lobby server 13 to send the reply mail for acceptance, which notifies that the request to play a game by invitation mail has been accepted, and if the member selects the "Sorry, not right now" button 277, the CPU 22 instructs the lobby server 13 to send the reply mail for rejection, which notifies that the request to play a game by invitation mail has been rejected.

Then in Step S133, the lobby server 13 instructs the mail server 12 to send the reply mail for acceptance or rejection to the member at the transmission source according to the received instruction, and the mail server 12 stores the reply mail for acceptance or rejection in the mail box of the member at the transmission source, and ends processing.

When the "Search" button 262 is selected in Step S52, the CPU 22 instructs the lobby server 13 to detect the access status of the member specified by the nickname which is displayed corresponding to the selected "Search" button 262 using the transmission section 26 in Step S58.

Then in Step S134, the lobby server 13 detects the access status of the instructed member, and sends the detection result to the client computer 2.

Then in Step S59, the CPU 22 displays the detection result of the access status of the member specified in the lower part of the friend list operation screen using the transmission section 26 on the display section 27, and ends processing.

Figure 28:
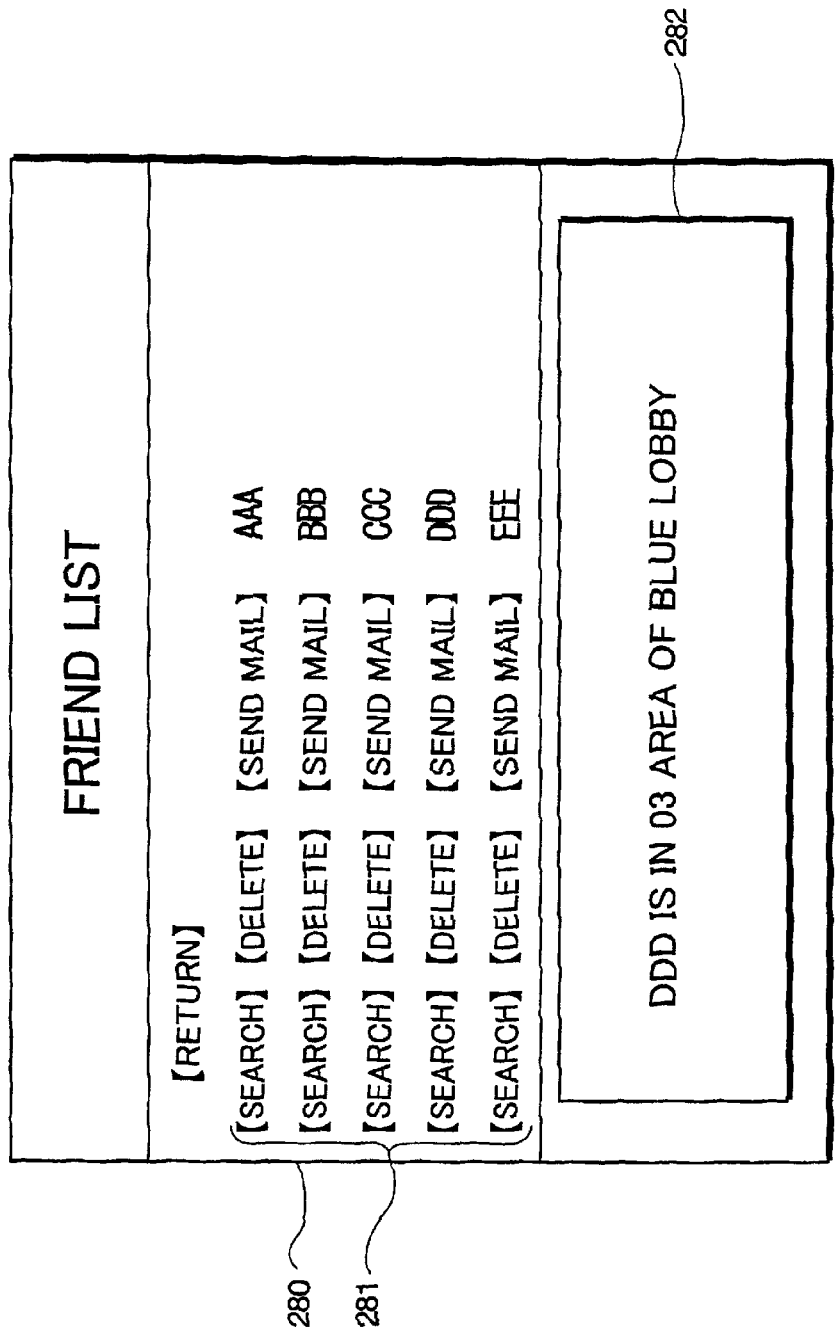
FIG. 28 is a diagram depicting an example of the friend list operation screen containing the access status detection result.

FIG. 28 is a diagram depicting an example of the friend list operation screen which includes the access status detection result. For example, when the "Search" button 281 corresponding to the member with the nickname DDD shown in FIG. 28 is selected, the access status of the member with the nickname DDD is displayed at the lower part 282 of the friend list operation screen 280, and it is learned that the member with the nickname DDD is in the 03 area of the BLUE lobby.

By the above processing, the access status of the client computer 2 of a member included in the friend list is detected, so the member can easily know the access status of the opponent with whom profile information is exchanged. Therefore an opponent who has accessed can be requested to play a game, or invitation mail can be created for an opponent who has not accessed, so appropriate handling according to the access status of the opponent with whom profile information has been exchanged can be easily performed.

The number of members who can be registered to the friend list of each member is limited, and in the case of the present embodiment, if the number of members exceeds 50, then each member must delete unnecessary members from the friend list so that the number of members registered in the friend list becomes 50 or less.

When a member selects the "Delete" button 263 shown in FIG. 26 to delete another member included in the friend list in the above mentioned case, the CPU 22 displays the delete confirmation screen to confirm whether this member has been deleted or not in the lower section of the friend list operation screen in Step S60 shown in FIG. 25.

FIG. 29 is a diagram depicting an example of the friend list operation screen which includes the delete confirmation screen. For example, the friend list operation screen 290 shown in FIG. 29 is displayed, and the delete confirmation screen 291 to confirm whether the member with the confirmation screen nickname DDD has been deleted from the friend list or not is displayed, whereby whether the member with the nickname DDD is deleted from the friend list or not is confirmed by selecting the "YES" button 292 or the "NO" button 293.

Then in Step S61, the CPU 22 judges whether the member has confirmed that another member is to be deleted from the friend list using the delete confirmation screen; if the member selects the "YES" button 292 for deleting using the mouse, processing moves to Step S62, and if the member selects the "NO" button 293 not to delete, the CPU 22 returns to Step S51 to continue subsequent processing.

When the "YES" button 292 is selected, the CPU 22 instructs the lobby server 13 to delete the selected member from the friend list using the transmission section 26 in Step S62.

Then in Step S135, the lobby server 13 instructs the game DB server 16 to delete the selected member from the friend list, and the game DB server 16 deletes the member selected from the friend list, and ends processing.

When the member selects the "Send Mail" button 264 to send an invitation mail to another member included on the friend list, the CPU 22 displays the template to create the invitation mail in the lower part of the friend list operation screen in Step S63.

FIG. 30 is a diagram depicting an example of the friend list operation screen where the template to create the invitation mail is displayed. For example, the friend list operation screen 300 shown in FIG. 30 is displayed, and the template 301 to create the invitation mail is displayed in the lower part of the friend list operation screen 300.

In the template 301 in FIG. 30, the invitation message is created by the member selecting a desired candidate out of a predetermined plurality of candidates for each item of date/time of game, location of game, and message.

Specifically, time can be selected in 15 minute units for the date/time of game, one game lobby is selected from a plurality of lobbies, such as "YELLOW", "ORANGE", "PURPLE" and "PINK", and one game area can be selected from 7 game areas "01" to "07", for the location of the game.

For a message, one message can be selected out of "I'm gonna win this time!", "Let's play seriously!", "Let me win!", "I'm a beginner", "I'm good!", "I'm poor" and so on. The items of the invitation mail are not limited to the above examples, but other items may be used, and the member may freely write a message.

After the member creates the invitation mail in this way, the CPU 22 judges whether the creation of the invitation mail is complete in Step 564; if the member selects the "OK" button 302 shown in FIG. 30 using the mouse, processing moves to Step S65, and if the member selects the "RETRY" button 303 shown in FIG. 30, the CPU 22 repeats Step S64.

When the "OK" button 302 is selected, in step S65, the CPU 22 sends the created invitation mail to the lobby server 13 using the transmission section 26.

Then in Step S136, the lobby server 13 sends the transmitted invitation mail to the mail server 12 via the member DB server 11, and the mail server 12 stores the invitation mail in the mail box of the specified member, and processing ends.

By the above mentioned processing, the invitation mail to an opponent, which the member selects using the client computer 2 from the friend list consisting of other members who have exchanged profile information, can be read at the client computer 2 of the opponent. Therefore the member can automatically create an invitation mail which the opponent can read by merely selecting a desired opponent from the friend list, so the member can easily play a game with a desired opponent.

In the above description, a case in which a member who has paid a predetermined fee to play a net game was described, but the present invention can be applied in the same way to a case in which unspecified users pay a fee using a prepaid card or when a net game can be played free of charge, whereby the same effect can be achieved.

According to the present embodiment, a personal computer is used as the terminal device, but other terminal devices, such as a portable telephone and a portable information terminal, may be used as long as a net game can be played on such a device.

In summary, the present invention relates to a server device for net games which is communicably connected via a network to a plurality of terminal devices used by users so that the users manage a game played in a game space using the terminal devices. The server device comprises acquiring means for acquiring profile information of the user which is transmitted from the terminal device, and exchanging means by which profile information of one user acquired by the acquiring means can be read at the terminal device of the other user, and profile information of the other user acquired by the acquiring means can be read at the terminal device of the first user when the users play a game with profile exchange where profiles are invariably exchanged using the terminal devices.

According to the aforementioned structure, the server device for net games which is communicably connected via a network to a plurality of terminal devices used by users and manage a game played in a game space by the users using the terminal devices, comprises acquiring means for acquiring user profile information which is transmitted from the terminal device, and exchanging means by which the profile information of one user acquired by the acquiring means can be read at the terminal device of the other user, and the profile information of the other user acquired by the acquiring means can be read at the terminal device of the first user when the users play a game with profile exchange where profiles are invariably exchanged using the terminal devices.

In other words, when the user profile information which is sent from the terminal device is acquired and a game with profile exchange where the users invariably exchange profile information using the terminal devices is played, the acquired profile information of one user can be read at the terminal device of the other user, and the acquired profile information of the other user can be read at the terminal device of the first user.

In this way, the profile information of the opponents can be exchanged and read between the users who play the game with profile exchange, so that the users can know the profile information of each other. Also a player can be specified based on the profile information, so games can be played consecutively with a specified player. Also even if the opponent player has not accessed when one user accesses to play the net game, the user can request another user to play the game with whom he/she is acquainted through profile exchange, so the enthusiasm of the user to participate in net games can be improved. As a result, users can learn profile information about each other, so friendship among users can be promoted through net games, and also games can be played consecutively with a specified player, so sufficient excitement can be given to the user, user enthusiasm to participate in a net game can be improved, and as a result, net games can be operated smoothly.

In addition, the present invention may further comprise deciding means for deciding a player from among other users with whom the game with profile exchange is to be played, according to screening conditions which the user sets using the terminal device.

According to the above described feature, the server device for net games further comprises deciding means for deciding a player from among other users with whom the game with profile exchange is to be played, according to screening conditions which the user sets using the terminal device.

In other words, a player from among other users with whom the game with profile exchange is to be played is determined according to screening conditions which the user sets using the terminal device, so the user can select a player with whom to play the game using the screening conditions. Also the user can relax the screening conditions when a player to play a game with cannot be found, or conversely can make the screening conditions stricter when many players are extracted. As a result, users can select a player to play a game using screening conditions, so the user can exchange profile information only with a player with whom the user wants to build a friendship. Screening conditions can be relaxed so a player-opponent can be found quickly, and also screening conditions-can be made stricter so a more suitable player can be selected.

Furthermore, the present invention may have the following feature that the game time of the game with profile exchange is set so as to be shorter than the game time of a profile exchange optional game, where the exchange of profile information is optional.

According to the above described feature, the game time of a game with profile exchange where profile information is invariably exchanged is set so as to be shorter than the game time of a profile exchange optional game, where the exchange of profile information is optional.

In other words, the game time of a game with profile exchange is shorter than the game time of a profile exchange optional game, so the user can play more games with profile exchange than profile exchange optional games, and can have more opportunities to exchange profile information with other users. As a result, the user can have many opportunities to exchange profile information with another user, so the friendships of the user can be easily expanded.

Moreover, the present invention may further comprise list creating means for creating a list of other users with whom profile information has been exchanged by the exchanging means, and mail creating means by which an invitation mail for the user to request another user, who is selected from the list created by the list creating means using the terminal device, to play a game together can be read at the terminal of the selected other user.

According to the above described feature, the server device for net games further comprises list creating means for creating a list of other users with whom profile information has been exchanged by the exchanging means, and mail creating means by which an invitation mail for the user to request another user, who is selected from the list created by the list creating means using the terminal device, to play a game together can be read at the terminal of the selected other user.

In other words, a list of other users with whom profile information has been exchanged is created, and an invitation mail for the user to request another user, who is selected from the created list using the terminal device, to play a game together can be read at the terminal device of the selected other user. Therefore the user can automatically create an invitation mail which the desired other user can read merely by selecting this user from the list. As a result, the user can automatically create an invitation mail which the user can read merely by selecting a desired user from the list of other users with whom the user has exchanged profile information, so the user can play a game easily with a desired user.

Yet Moreover, the present invention may further comprise detecting means for detecting the access status of the terminal device used by another user included in the list created by the list creating means.

According to the above described feature, the server device for net games further comprises detecting means for detecting the access status of the terminal device used by another user included in the list created by the list creating means.

In other words, the access status of the terminal device used by another user included in the created list is detected, so the user can easily learn the access status of the other user with whom profile information has been exchanged, and can request another user who has accessed the server device for net games to play a game together, or create an invitation mail to request another user who has not accessed the server device for net games to play a game together. As a result, the user can request to play a game with another user who has accessed the server device for net games or create an invitation mall for requesting to play a game with another user who has not accessed the server device for net games, so appropriate handling according to the access status of another user with whom profile information is exchanged can be easily performed.

Furthermore, the present invention may further comprise order presenting means by which the player order of the team which another user to be an opponent intends to use can be read at the terminal device of the user.

According to the above described feature, the server device for net games further comprises order presenting means by which the player order of the team which another user to be an opponent intends to use can be read at the terminal device of the user.

In other words, the team player order to be used in a game of another user to be an opponent can be read at the terminal device of the user, so the user can learn the player configuration of the team and other information in detail by viewing the player order of the team of the other user, and by comparing and considering the player order of the user's own team and the player order of the team of the other user, can closely judge whether or not to play a game with the other user. As a result, the user can carefully judge whether a game will be played with another user by comparing the player order of the team of the user and the player order of the team of the other user, so a game can be played based on careful strategies based on the team order of teams, and excitement of net games can be further improved.

The present invention relates also to a net game management method using a server device for net games which is communicably connected via a network to a plurality of terminal devices used by users and manages a game played in a game space by the users using the terminal devices. The method of the present invention comprises a profile information acquiring step for the server device for net games to acquire profile information of the user which is transmitted from the terminal device, and a profile information exchanging step by which the profile information of one user acquired in the profile information acquiring step can be read at the terminal device of the other user, and the profile information of the other user acquired in the profile information acquiring step can be read at the terminal device of the first user when the users play a game with profile exchange where profiles are invariably exchanged using the terminal devices.

According to the above description, the net game management method using a server device for net games which is communicably connected via a network to a plurality of terminal devices used by users and manages a game played in a game space by the users using the terminal devices comprises a profile information acquiring step for the in server device for net games to acquire profile information of the user which is transmitted from the terminal device, and a profile information exchanging step by which the profile information of one user acquired in the profile information acquiring step can be read at the terminal device of the other user, and the profile information of the other user acquired in the profile information acquiring step can be read at the terminal device of the first user when the users play a game with profile exchange where profiles are invariably exchanged using the terminal devices.

In other words, the profile information of the user which is transmitted from the terminal device is acquired by the server device for net games, and when the user plays a game with profile exchange where profile information is invariably exchanged using the terminal devices, the acquired information of one user can be read at the terminal device of the other user, and the acquired profile information of the other user can be read at the terminal device of the first user.

In this way, the user-players of the game with profile exchange can exchange profile information and read the profile information of each other, so the profile information can be known among the users. Also a player can be specified by the profile information, so games can be played consecutively with a specific player. Also, even if another user with whom the game is played has not accessed when a user accesses to play a net game, the user can request another user who has become an acquaintance via an exchange of profile information to play the game with, so the enthusiasm of the user to participate in net games can be improved. As a result, users can learn profile information about each other, so friendship among users can be promoted through net games, and also games can be played consecutively with a specific user, so sufficient excitement can be given to the user, user enthusiasm to participate in net games can be improved, and as a result, net games can be operated smoothly.

The invention, furthermore, relates to a net game management program which causes a server device for net games, which is communicably connected via a network to a plurality of terminal devices used by users and manages a game played in a game space by the users using the terminal devices, to function as acquiring means for acquiring profile information of the user which is transmitted from the terminal device, and exchanging means by which the profile information of one user acquired by the acquiring means can be read at the terminal device of the other user, and the profile information of the other user acquired by the acquiring means can be read at the terminal device of the first user when the users play a game with profile exchange where profiles are invariably exchanged using the terminal devices.

According to the aforementioned description, the net game management program causes a server device for net games, which is communicably connected via a network to a plurality of terminal devices used by users and manages a game played in a game space by the users using the terminal devices, to function as acquiring means for acquiring profile information of the user which is transmitted from the terminal device, and exchanging means by which the profile information of one user acquired by the acquiring means can be read at the terminal device of the other user, and the profile information of the other user acquired by the acquiring means can be read at the terminal device of the first user when the users play a game with profile exchange where profiles are invariably exchanged using the terminal devices.

In other words, the profile information of the user which is transmitted from the terminal device is acquired by the server device for net games, and when users play a game with profile exchange where profiles are invariably exchanged using the terminal devices, the acquired profile information of one user can be read at the terminal device of the other user, and the acquired profile information of the other user can be read at the terminal device of the first user.

In this way, the user-players of the game with profile exchange can exchange profile information and read the profile information of each other, so the profile information can be known among the users. Also a player can be specified by the profile information, so games can be played consecutively with a specified player. Also, even if another user with whom the game is played has not accessed when a user accesses to play a net game, the user can request another user who has become an acquaintance via an exchange of profile information to play the game with, so the enthusiasm of the user to participate in net games can be improved. As a result, users can learn profile information about each other, so friendship among users can be promoted through net games, and also games can be played consecutively with a specific user, so sufficient excitement can be given to the user, user enthusiasm to participate in net games can be improved, and as a result, net games can be operated smoothly.

This application is based on Japanese Patent Application Serial No. 2001-161342 filed in Japan Patent Office on May 29, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A server device for net games which is communicably connected via a network to a plurality of terminal devices used by users, and manages a game played in a game space by the users using said terminal devices, said server comprising:

acquiring means for acquiring profile information of a user which is transmitted from a terminal device used by the user;

exchanging means enabling that the profile information of the user acquired by said acquiring means can be read at the terminal device of another user, and the profile information of the other user acquired by said acquiring means can be read at the terminal device of the user when the users play a game with profile exchange using said terminal devices where profile information is exchanged, and deciding means for selecting the other user, with whom said user is to play said game with profile exchange, from among the users according to screening conditions which the user sets using said terminal device, said screening condition including a speed of communication line connecting the terminal device of the other user and the network.

2. The server device according to claim 1, further comprising:

list creating means for creating a list of other users with whom profile information has been exchanged by said exchanging means; and mail creating means by which an invitation mail for the user to request another user, selected from the list created by said list creating means using said terminal device, to play a game together can be read at the terminal of the selected other user.

3. The server device according to claim 2, further comprising detecting means for detecting the access status of the terminal device used by another user included in the list created by said list creating means.

4. A net game management method using a server device for net games which is communicably connected via a network to a plurality of terminal devices used by users, and manages a game played in a game space by the users using said terminal devices, the method comprising the steps of:

a profile information acquiring step for the server device for net games to acquire profile information of a user which is transmitted from a terminal device of the user; and a profile information exchanging step enabling that the profile information of the user acquired by said acquiring means can be read at the terminal device of another user, and the profile information of the other user acquired by said acquiring means can be read at the terminal device of the user when the users play a game with profile exchange using said terminal devices where profile information is exchanged, and a deciding step for selecting the other user, with whom said user is to play said game with profile exchange, from among the users according to screening conditions which the user sets using said terminal device, said screening condition including a speed of communication line connecting the terminal device of the other user and the network.

5. A recording medium which stores a net game management program executable by a server device for net games, said net game management program causing the server device, which is communicably connected via a network to a plurality of terminal devices used by users and manages a game played in a game space by the users using said terminal devices, to function as:

acquiring means for acquiring profile information of a user which is transmitted from a terminal device used by the user;

exchanging means by which the profile information of the user acquired by said acquiring means can be read at the terminal device of another user, and the profile information of the other user acquired by said acquiring means can be read at the terminal device of the user when the users play a game with profile exchange using said terminal devices where profile information is exchanged, and deciding means for selecting the other user, with whom said user is to play said game with profile exchange, from among the users according to screening conditions which the user sets using said terminal device, said screening condition including a speed of communication line connecting the terminal device of the other user and the network.

6. A server device for net games which is communicably connected via a network to a plurality of terminal devices used by users, and manages a game played in a game space by the users using said terminal devices, said server comprising:

acquiring means for acquiring profile information of a user which is transmitted from a terminal device used by the user; and exchanging means enabling that the profile information of the user acquired by said acquiring means can be read at the terminal device of another user, and the profile information of the other user acquired by said acquiring means can be read at the terminal device of the user when the users play a game with profile exchange using said terminal devices where profile information is exchanged, wherein a game time of said game with profile exchange is set so as to be shorter than a game time of a profile exchange optional game where the exchange of profile information is optional.

7. The server device according to claim 6 wherein said game includes a plurality of innings and a total number of innings to be played during said game with profile exchange is set smaller than that to be played during the profile exchange optional game.

8. A server device for net games which is communicably connected via a network to a plurality of terminal devices used by users, and manages a game played in a game space by the users using said terminal devices, said server comprising:

acquiring means for acquiring profile information of a user which is transmitted from a terminal device used by the user;

exchanging means enabling that the profile information of the user acquired by said acquiring means can be read at the terminal device of another user, and the profile information of the other user acquired by said acquiring means can be read at the terminal device of the user when the users play a game with profile exchange using said terminal devices where profile information is exchanged; and order presenting means allowing the user to read on the terminal device of the user an order of players forming an opponent team played by the another user at the terminal of the another user.

* * * * *